(12) United States Patent
Affronti et al.

(10) Patent No.: US 8,402,096 B2
(45) Date of Patent: Mar. 19, 2013

(54) AUTOMATIC CONVERSATION TECHNIQUES

(75) Inventors: Michael Affronti, Seattle, WA (US); Andrew Brauninger, Seattle, WA (US); Robert Emmett Mccann, Redmond, WA (US); James Edelen, Seattle, WA (US); Jorge Pereira, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/144,642

(22) Filed: Jun. 24, 2008

(65) Prior Publication Data
US 2009/0319619 A1    Dec. 24, 2009

(51) Int. Cl.
  G06F 15/16    (2006.01)
  H04W 4/00    (2009.01)
  G06F 15/177    (2006.01)
(52) U.S. Cl. ......... 709/206; 709/204; 455/466; 715/734
(58) Field of Classification Search ........... 709/204–207
  See application file for complete search history.

(56) References Cited

U.S. PATENT DOCUMENTS

| | | | |
|---|---|---|---|
| 4,823,283 A | 4/1989 | Diehm et al. |
| 5,155,806 A | 10/1992 | Hoeber et al. |
| 5,220,675 A | 6/1993 | Padawer et al. |
| 5,247,438 A | 9/1993 | Subas et al. |
| 5,305,435 A | 4/1994 | Bronson |
| 5,323,314 A | 6/1994 | Baber et al. |
| 5,377,354 A | 12/1994 | Scannell et al. |
| 5,412,772 A | 5/1995 | Monson |
| 5,461,708 A | 10/1995 | Kahn |
| 5,500,936 A | 3/1996 | Allen et al. |
| 5,519,606 A | 5/1996 | Frid-Nielsen et al. |
| 5,559,875 A | 9/1996 | Bieselin et al. |
| 5,559,944 A | 9/1996 | Ono |
| 5,570,109 A | 10/1996 | Jenson |
| 5,581,677 A | 12/1996 | Myers et al. |
| 5,588,107 A | 12/1996 | Bowden et al. |

(Continued)

FOREIGN PATENT DOCUMENTS

| | | |
|---|---|---|
| AU | 2005203411 | 3/2006 |
| AU | 2007255043 | 8/2012 |

(Continued)

OTHER PUBLICATIONS

Mock, et al., "An Experimental Framework for Email Categorization and Management", Sep. 9-12, 2001, 3 pages.

(Continued)

Primary Examiner — Ashok Patel
Assistant Examiner — Evans Desrosiers
(74) Attorney, Agent, or Firm — Merchant & Gould

(57) ABSTRACT

Automatic conversation techniques are described. An apparatus may comprise a computing device having an incoming message module operative to receive an incoming message, a conversation identification module communicatively coupled to the incoming message module, the conversation identification module operative to determine the incoming message is part of a conversation thread, and associate the incoming message with the conversation thread by setting a conversation identifier property of the incoming message to a conversation identifier for the conversation thread, and a conversation manager module communicatively coupled to the conversation identification module, the conversation manager module operative to determine a conversation rule is associated with the conversation thread, and apply the conversation rule to the incoming message. Other embodiments are described and claimed.

12 Claims, 10 Drawing Sheets

U.S. PATENT DOCUMENTS

| | | | |
|---|---|---|---|
| 5,592,602 A | 1/1997 | Edmunds |
| 5,596,694 A | 1/1997 | Capps |
| 5,625,783 A | 4/1997 | Ezekiel et al. |
| 5,634,100 A | 5/1997 | Capps |
| 5,634,128 A | 5/1997 | Messina |
| 5,638,504 A | 6/1997 | Scott et al. |
| 5,644,737 A | 7/1997 | Tuniman et al. |
| 5,659,693 A | 8/1997 | Hansen et al. |
| 5,664,127 A | 9/1997 | Anderson et al. |
| 5,664,208 A | 9/1997 | Pavley et al. |
| 5,673,403 A | 9/1997 | Brown et al. |
| 5,721,847 A | 2/1998 | Johnson |
| 5,734,915 A | 3/1998 | Roewer |
| 5,760,768 A | 6/1998 | Gram |
| 5,760,773 A | 6/1998 | Berman et al. |
| 5,761,646 A | 6/1998 | Frid-Nielsen et al. |
| 5,764,960 A | 6/1998 | Perks et al. |
| 5,778,402 A | 7/1998 | Gipson |
| 5,778,404 A | 7/1998 | Capps et al. |
| 5,787,295 A | 7/1998 | Nakao |
| 5,793,365 A | 8/1998 | Tang et al. |
| 5,796,393 A | 8/1998 | MacNaughton et al. |
| 5,805,167 A | 9/1998 | Van Cruyningen |
| 5,812,132 A | 9/1998 | Goldstein |
| 5,821,936 A | 10/1998 | Shaffer et al. |
| 5,828,376 A | 10/1998 | Solimene et al. |
| 5,838,321 A | 11/1998 | Wolf |
| 5,842,009 A | 11/1998 | Borovoy et al. |
| 5,844,558 A | 12/1998 | Kumar et al. |
| 5,844,572 A | 12/1998 | Schott |
| 5,855,006 A | 12/1998 | Huemoeller et al. |
| 5,864,848 A | 1/1999 | Horvitz et al. |
| 5,872,973 A | 2/1999 | Mitchell et al. |
| 5,873,108 A | 2/1999 | Goyal et al. |
| 5,874,953 A | 2/1999 | Webster et al. |
| 5,885,006 A | 3/1999 | Sheedy |
| 5,893,073 A | 4/1999 | Kasso et al. |
| 5,893,125 A | 4/1999 | Shostak |
| 5,898,436 A | 4/1999 | Stewart et al. |
| 5,899,979 A | 5/1999 | Miller et al. |
| 5,905,863 A | 5/1999 | Knowles et al. |
| 5,926,806 A | 7/1999 | Marshall et al. |
| 5,936,625 A | 8/1999 | Kahl et al. |
| 5,937,160 A | 8/1999 | Davis et al. |
| 5,940,078 A | 8/1999 | Nagarajayya et al. |
| 5,940,847 A | 8/1999 | Fein et al. |
| 5,943,051 A | 8/1999 | Onda et al. |
| 5,960,406 A | 9/1999 | Rasansky et al. |
| 5,970,466 A | 10/1999 | Detjen et al. |
| 5,999,173 A | 12/1999 | Ubillos |
| 5,999,938 A | 12/1999 | Bliss et al. |
| 6,008,806 A | 12/1999 | Nakajima et al. |
| 6,012,075 A | 1/2000 | Fein et al. |
| 6,016,478 A | 1/2000 | Zhang et al. |
| 6,018,343 A | 1/2000 | Wang et al. |
| 6,034,683 A | 3/2000 | Mansour et al. |
| 6,038,395 A | 3/2000 | Chow et al. |
| 6,038,542 A | 3/2000 | Ruckdashel |
| 6,043,816 A | 3/2000 | Williams et al. |
| 6,067,087 A | 5/2000 | Krauss et al. |
| 6,067,551 A | 5/2000 | Brown et al. |
| 6,072,492 A | 6/2000 | Schagen et al. |
| 6,073,110 A | 6/2000 | Rhodes et al. |
| 6,073,142 A | 6/2000 | Geiger et al. |
| 6,085,206 A | 7/2000 | Domini et al. |
| 6,101,480 A | 8/2000 | Conmy et al. |
| 6,133,915 A | 10/2000 | Arcuri et al. |
| 6,154,755 A | 11/2000 | Dellert et al. |
| 6,175,363 B1 | 1/2001 | Williams et al. |
| 6,188,403 B1 | 2/2001 | Sacerdoti et al. |
| 6,189,024 B1 | 2/2001 | Bauersfeld et al. |
| 6,192,381 B1 | 2/2001 | Stiegemeier et al. |
| 6,195,094 B1 | 2/2001 | Celebiler |
| 6,199,102 B1 | 3/2001 | Cobb |
| 6,211,879 B1 | 4/2001 | Soohoo |
| 6,216,122 B1 | 4/2001 | Elson |
| 6,219,670 B1 | 4/2001 | Mocek et al. |
| 6,222,540 B1 | 4/2001 | Sacerdoti |
| 6,232,971 B1 | 5/2001 | Haynes |
| 6,236,396 B1 | 5/2001 | Jenson et al. |
| 6,237,135 B1 | 5/2001 | Timbol |
| 6,239,798 B1 | 5/2001 | Ludolph et al. |
| 6,256,628 B1 | 7/2001 | Dobson et al. |
| 6,269,341 B1 | 7/2001 | Redcay, Jr. |
| 6,278,450 B1 | 8/2001 | Arcuri et al. |
| 6,289,317 B1 | 9/2001 | Peterson |
| 6,307,544 B1 | 10/2001 | Harding |
| 6,307,574 B1 | 10/2001 | Ashe |
| 6,323,883 B1 | 11/2001 | Minoura et al. |
| 6,326,962 B1 | 12/2001 | Szabo |
| 6,327,046 B1 | 12/2001 | Miyamoto et al. |
| 6,330,589 B1 | 12/2001 | Kennedy |
| 6,341,277 B1 | 1/2002 | Coden et al. |
| 6,353,451 B1 | 3/2002 | Teibel et al. |
| 6,359,634 B1 | 3/2002 | Cragun et al. |
| 6,373,507 B1 | 4/2002 | Camara et al. |
| 6,384,849 B1 | 5/2002 | Morcos et al. |
| 6,385,769 B1 | 5/2002 | Lewallen |
| 6,405,216 B1 | 6/2002 | Minnaert et al. |
| 6,424,829 B1 | 7/2002 | Kraft |
| 6,429,882 B1 | 8/2002 | Abdelnur et al. |
| 6,430,563 B1 | 8/2002 | Fritz et al. |
| 6,433,801 B1 | 8/2002 | Moon et al. |
| 6,433,831 B1 | 8/2002 | Dinwiddie et al. |
| 6,434,598 B1 | 8/2002 | Gish |
| 6,442,527 B1 | 8/2002 | Worthington |
| 6,456,304 B1 | 9/2002 | Angiulo et al. |
| 6,457,062 B1 | 9/2002 | Pivowar et al. |
| 6,459,441 B1 | 10/2002 | Perroux et al. |
| 6,466,236 B1 | 10/2002 | Pivowar et al. |
| 6,469,722 B1 | 10/2002 | Kinoe et al. |
| 6,469,723 B1 | 10/2002 | Gould |
| 6,480,865 B1 | 11/2002 | Lee et al. |
| 6,484,180 B1 | 11/2002 | Lyons et al. |
| 6,493,006 B1 | 12/2002 | Gourdol et al. |
| 6,493,731 B1 | 12/2002 | Jones et al. |
| 6,507,845 B1 | 1/2003 | Cohen et al. |
| 6,546,417 B1 | 4/2003 | Baker |
| 6,570,596 B2 | 5/2003 | Frederiksen |
| 6,578,192 B1 | 6/2003 | Boehme et al. |
| 6,583,798 B1 | 6/2003 | Hoek et al. |
| 6,618,732 B1 | 9/2003 | White et al. |
| 6,621,504 B1 | 9/2003 | Nadas et al. |
| 6,621,508 B1 | 9/2003 | Shiraishi et al. |
| 6,635,089 B1 | 10/2003 | Burkett et al. |
| 6,654,791 B1 | 11/2003 | Bates et al. |
| 6,664,983 B2 | 12/2003 | Ludolph |
| 6,680,749 B1 | 1/2004 | Anderson et al. |
| 6,686,938 B1 | 2/2004 | Jobs et al. |
| 6,691,281 B1 | 2/2004 | Sorge et al. |
| 6,701,513 B1 | 3/2004 | Bailey |
| 6,707,454 B1 | 3/2004 | Barg |
| 6,708,205 B2 | 3/2004 | Sheldon et al. |
| 6,721,402 B2 | 4/2004 | Usami |
| 6,727,919 B1 | 4/2004 | Reder et al. |
| 6,732,330 B1 | 5/2004 | Claussen et al. |
| 6,734,880 B2 | 5/2004 | Chang et al. |
| 6,750,850 B2 | 6/2004 | O'Leary |
| 6,750,890 B1 | 6/2004 | Sugimoto |
| 6,785,868 B1 | 8/2004 | Raff |
| 6,789,107 B1 | 9/2004 | Bates et al. |
| 6,825,859 B1 | 11/2004 | Severenuk et al. |
| 6,826,729 B1 | 11/2004 | Giesen et al. |
| 6,850,255 B2 | 2/2005 | Muschetto |
| 6,871,195 B2 | 3/2005 | Ryan et al. |
| 6,882,354 B1 | 4/2005 | Nielsen |
| 6,895,426 B1 | 5/2005 | Cortright et al. |
| 6,904,449 B1 | 6/2005 | Quinones |
| 6,906,717 B2 | 6/2005 | Couckuyt et al. |
| 6,915,492 B2 | 7/2005 | Kurtenbach et al. |
| 6,924,797 B1 | 8/2005 | MacPhail |
| 6,925,605 B2 | 8/2005 | Bates et al. |
| 6,928,613 B1 | 8/2005 | Ishii |
| 6,941,304 B2 | 9/2005 | Gainey et al. |
| 6,964,025 B2 | 11/2005 | Angiulo |
| 6,983,889 B2 | 1/2006 | Alles |
| 6,988,241 B1 | 1/2006 | Guttman et al. |

| | | | | | | |
|---|---|---|---|---|---|---|
| 6,990,637 | B2 | 1/2006 | Anthony et al. | 2002/0052721 A1 | 5/2002 | Ruff et al. |
| 6,990,652 | B1 | 1/2006 | Parthasarathy et al. | 2002/0052880 A1 | 5/2002 | Fruensgaard et al. |
| 6,990,654 | B2 | 1/2006 | Carroll, Jr. | 2002/0070977 A1 | 6/2002 | Morcos et al. |
| 7,027,463 | B2 | 4/2006 | Mathew et al. | 2002/0073156 A1 | 6/2002 | Newman |
| 7,032,210 | B2 | 4/2006 | Alloing et al. | 2002/0075330 A1 | 6/2002 | Rosenzweig et al. |
| 7,039,596 | B1 | 5/2006 | Lu | 2002/0078143 A1 | 6/2002 | DeBoor et al. |
| 7,046,848 | B1 | 5/2006 | Olcott | 2002/0083054 A1 | 6/2002 | Peltonen et al. |
| 7,069,538 | B1 | 6/2006 | Renshaw | 2002/0091697 A1 | 7/2002 | Huang et al. |
| 7,107,544 | B1 | 9/2006 | Luke | 2002/0091739 A1 | 7/2002 | Ferlitsch |
| 7,110,936 | B2 | 9/2006 | Hiew et al. | 2002/0122071 A1 | 9/2002 | Camara et al. |
| 7,111,238 | B1 | 9/2006 | Kuppusamy et al. | 2002/0133557 A1 | 9/2002 | Winarski |
| 7,117,370 | B2 | 10/2006 | Khan et al. | 2002/0135621 A1 | 9/2002 | Angiulo et al. |
| 7,149,983 | B1 | 12/2006 | Robertson et al. | 2002/0140731 A1 | 10/2002 | Subramaniam et al. |
| 7,152,207 | B1 | 12/2006 | Underwood et al. | 2002/0140740 A1 | 10/2002 | Chen |
| 7,181,697 | B2 | 2/2007 | Tai et al. | 2002/0149623 A1 | 10/2002 | West et al. |
| 7,188,073 | B1 | 3/2007 | Tam et al. | 2002/0149629 A1 | 10/2002 | Craycroft et al. |
| 7,188,317 | B1 | 3/2007 | Hazel | 2002/0154178 A1 | 10/2002 | Barnett et al. |
| 7,206,813 | B2 | 4/2007 | Dunbar et al. | 2002/0158876 A1 | 10/2002 | Janssen |
| 7,206,814 | B2 | 4/2007 | Kirsch | 2002/0163538 A1 | 11/2002 | Shteyn |
| 7,212,208 | B2 | 5/2007 | Khozai | 2002/0175938 A1 | 11/2002 | Hackworth |
| 7,216,301 | B2 | 5/2007 | Moehrle | 2002/0175955 A1 | 11/2002 | Gourdol et al. |
| 7,219,305 | B2 | 5/2007 | Jennings | 2002/0186257 A1 | 12/2002 | Cadiz et al. |
| 7,240,323 | B1 | 7/2007 | Desai et al. | 2002/0196293 A1 | 12/2002 | Suppan et al. |
| 7,249,325 | B1 | 7/2007 | Donaldson | 2003/0009455 A1 | 1/2003 | Carlson et al. |
| 7,263,668 | B1 | 8/2007 | Lentz | 2003/0011564 A1 | 1/2003 | Ushino et al. |
| 7,290,033 | B1 | 10/2007 | Goldman et al. | 2003/0011638 A1 | 1/2003 | Chung |
| 7,296,241 | B2 | 11/2007 | Oshiro et al. | 2003/0011639 A1 | 1/2003 | Webb |
| 7,325,204 | B2 | 1/2008 | Rogers | 2003/0014421 A1 | 1/2003 | Jung |
| 7,328,409 | B2 | 2/2008 | Awada et al. | 2003/0014490 A1 | 1/2003 | Bates et al. |
| 7,337,185 | B2 | 2/2008 | Ellis et al. | 2003/0022700 A1 | 1/2003 | Wang |
| 7,346,705 | B2 | 3/2008 | Hullot et al. | 2003/0025732 A1 | 2/2003 | Prichard |
| 7,346,769 | B2 | 3/2008 | Forlenza et al. | 2003/0025737 A1 | 2/2003 | Breinberg |
| 7,356,772 | B2 | 4/2008 | Brownholtz et al. | 2003/0035917 A1 | 2/2003 | Hyman |
| 7,360,174 | B2 | 4/2008 | Grossman et al. | 2003/0038832 A1 | 2/2003 | Sobol |
| 7,386,535 | B1 | 6/2008 | Kalucha et al. | 2003/0043200 A1 | 3/2003 | Faieta et al. |
| 7,386,835 | B1 | 6/2008 | Desai et al. | 2003/0043211 A1 | 3/2003 | Kremer et al. |
| 7,392,249 | B1 | 6/2008 | Harris et al. | 2003/0046528 A1 | 3/2003 | Haitani et al. |
| 7,395,221 | B2 | 7/2008 | Doss et al. | 2003/0066025 A1 | 4/2003 | Garner et al. |
| 7,395,500 | B2 | 7/2008 | Whittle et al. | 2003/0069892 A1 | 4/2003 | Hind et al. |
| 7,421,660 | B2 | 9/2008 | Charnock et al. | 2003/0069900 A1 | 4/2003 | Hind et al. |
| 7,421,690 | B2 | 9/2008 | Forstall et al. | 2003/0070143 A1 | 4/2003 | Maslov |
| 7,426,713 | B2 | 9/2008 | Duggan et al. | 2003/0084035 A1 | 5/2003 | Emerick |
| 7,469,385 | B2 | 12/2008 | Harper et al. | 2003/0093490 A1 | 5/2003 | Yamamoto et al. |
| 7,472,117 | B2 | 12/2008 | Dettinger et al. | 2003/0097361 A1 | 5/2003 | Huang et al. |
| 7,484,213 | B2 | 1/2009 | Mathew et al. | 2003/0097640 A1 | 5/2003 | Abrams et al. |
| 7,499,907 | B2 | 3/2009 | Brown et al. | 2003/0098891 A1 | 5/2003 | Molander |
| 7,505,954 | B2 | 3/2009 | Heidloff et al. | 2003/0106024 A1 | 6/2003 | Silverbrook et al. |
| 7,530,029 | B2 | 5/2009 | Satterfield et al. | 2003/0110191 A1 | 6/2003 | Handsaker et al. |
| 7,555,707 | B1 | 6/2009 | Labarge et al. | 2003/0112278 A1 | 6/2003 | Driskell |
| 7,567,964 | B2 | 7/2009 | Brice et al. | 2003/0135825 A1 | 7/2003 | Gertner et al. |
| 7,584,253 | B2 | 9/2009 | Curbow et al. | 2003/0156140 A1 | 8/2003 | Watanabe |
| 7,627,561 | B2 | 12/2009 | Pell et al. | 2003/0160821 A1 | 8/2003 | Yoon |
| 7,664,821 | B1 * | 2/2010 | Ancin et al. ............ 709/206 | 2003/0163455 A1 | 8/2003 | Dettinger et al. |
| 7,703,036 | B2 | 4/2010 | Satterfield et al. | 2003/0163537 A1 | 8/2003 | Rohall et al. |
| 7,707,255 | B2 | 4/2010 | Satterfield et al. | 2003/0167310 A1 | 9/2003 | Moody et al. |
| 7,711,742 | B2 | 5/2010 | Bennett et al. | 2003/0169284 A1 | 9/2003 | Dettinger et al. |
| 7,716,593 | B2 | 5/2010 | Durazo et al. | 2003/0195937 A1 | 10/2003 | Kircher et al. |
| 7,739,259 | B2 | 6/2010 | Hartwell et al. | 2003/0206646 A1 | 11/2003 | Brackett |
| 7,747,966 | B2 | 6/2010 | Leukart et al. | 2003/0218611 A1 | 11/2003 | Ben-Tovim et al. |
| 7,788,598 | B2 | 8/2010 | Bansal et al. | 2003/0226106 A1 | 12/2003 | McKellar et al. |
| 7,802,199 | B2 | 9/2010 | Shneerson et al. | 2003/0227487 A1 | 12/2003 | Hugh |
| 7,831,902 | B2 | 11/2010 | Sourov et al. | 2003/0233419 A1 | 12/2003 | Beringer |
| 7,853,877 | B2 | 12/2010 | Giesen et al. | 2004/0003351 A1 | 1/2004 | Sommerer et al. |
| 7,865,868 | B2 | 1/2011 | Falzone Schaw et al. | 2004/0006570 A1 | 1/2004 | Gelb et al. |
| 7,870,465 | B2 | 1/2011 | VerSteeg | 2004/0012633 A1 | 1/2004 | Helt |
| 7,886,290 | B2 | 2/2011 | Dhanjal et al. | 2004/0021647 A1 | 2/2004 | Iwema et al. |
| 7,895,531 | B2 | 2/2011 | Radtke et al. | 2004/0030993 A1 | 2/2004 | Hong Huey et al. |
| 8,117,542 | B2 | 2/2012 | Radtke et al. | 2004/0044735 A1 | 3/2004 | Hoblit |
| 8,146,016 | B2 | 3/2012 | Himberger et al. | 2004/0056894 A1 | 3/2004 | Zaika et al. |
| 8,150,930 | B2 | 4/2012 | Satterfield et al. | 2004/0083432 A1 | 4/2004 | Kawamura et al. |
| 8,201,103 | B2 | 6/2012 | Dukhon et al. | 2004/0088359 A1 * | 5/2004 | Simpson ............ 709/206 |
| 8,239,882 | B2 | 8/2012 | Dhanjal et al. | 2004/0090315 A1 | 5/2004 | Mackjust et al. |
| 8,255,828 | B2 | 8/2012 | Harris et al. | 2004/0100504 A1 | 5/2004 | Sommer |
| 2001/0032220 | A1 | 10/2001 | Ven Hoff | 2004/0100505 A1 | 5/2004 | Cazier |
| 2001/0035882 | A1 | 11/2001 | Stoakley et al. | 2004/0107197 A1 | 6/2004 | Shen et al. |
| 2001/0049677 | A1 | 12/2001 | Talib et al. | 2004/0109025 A1 | 6/2004 | Hullot et al. |
| 2002/0007380 | A1 | 1/2002 | Bauchot et al. | 2004/0109033 A1 | 6/2004 | Vienneau et al. |
| 2002/0029247 | A1 | 3/2002 | Kawamoto | 2004/0117451 A1 | 6/2004 | Chung |
| 2002/0037754 | A1 | 3/2002 | Hama et al. | 2004/0119755 A1 | 6/2004 | Guibourge |

| | | |
|---|---|---|
| 2004/0119760 A1 | 6/2004 | Grossman et al. |
| 2004/0122789 A1 | 6/2004 | Ostertag et al. |
| 2004/0125142 A1 | 7/2004 | Mock et al. |
| 2004/0128275 A1 | 7/2004 | Moehrle |
| 2004/0133854 A1 | 7/2004 | Black |
| 2004/0142720 A1 | 7/2004 | Smethers |
| 2004/0153968 A1 | 8/2004 | Ching et al. |
| 2004/0164983 A1 | 8/2004 | Khozai |
| 2004/0168153 A1 | 8/2004 | Marvin |
| 2004/0186775 A1 | 9/2004 | Margiloff et al. |
| 2004/0189694 A1 | 9/2004 | Kurtz et al. |
| 2004/0192440 A1 | 9/2004 | Evans et al. |
| 2004/0205536 A1 | 10/2004 | Newman et al. |
| 2004/0215612 A1 | 10/2004 | Brody |
| 2004/0221234 A1 | 11/2004 | Imai |
| 2004/0230508 A1 | 11/2004 | Minnis et al. |
| 2004/0230906 A1 | 11/2004 | Pik et al. |
| 2004/0239700 A1 | 12/2004 | Baschy |
| 2004/0243938 A1 | 12/2004 | Weise et al. |
| 2004/0260756 A1 | 12/2004 | Forstall et al. |
| 2004/0261013 A1 | 12/2004 | Wynn et al. |
| 2004/0268231 A1 | 12/2004 | Tunning |
| 2004/0268270 A1 | 12/2004 | Hill et al. |
| 2005/0004989 A1 | 1/2005 | Satterfield et al. |
| 2005/0004990 A1 | 1/2005 | Durazo et al. |
| 2005/0005235 A1 | 1/2005 | Satterfield et al. |
| 2005/0005249 A1 | 1/2005 | Hill et al. |
| 2005/0010871 A1 | 1/2005 | Ruthfield et al. |
| 2005/0021504 A1 | 1/2005 | Atchison |
| 2005/0022116 A1 | 1/2005 | Bowman et al. |
| 2005/0027779 A1 | 2/2005 | Schinner |
| 2005/0033614 A1 | 2/2005 | Lettovsky et al. |
| 2005/0039142 A1 | 2/2005 | Jalon et al. |
| 2005/0043015 A1 | 2/2005 | Muramatsu |
| 2005/0044500 A1 | 2/2005 | Orimoto et al. |
| 2005/0055449 A1 | 3/2005 | Rappold, III |
| 2005/0057584 A1 | 3/2005 | Gruen et al. |
| 2005/0060337 A1 | 3/2005 | Chou et al. |
| 2005/0086135 A1 | 4/2005 | Lu |
| 2005/0091576 A1 | 4/2005 | Relyea et al. |
| 2005/0097465 A1 | 5/2005 | Giesen et al. |
| 2005/0114778 A1 | 5/2005 | Branson et al. |
| 2005/0114781 A1 | 5/2005 | Brownholtz et al. |
| 2005/0117179 A1 | 6/2005 | Ito et al. |
| 2005/0132010 A1 | 6/2005 | Muller |
| 2005/0132053 A1 | 6/2005 | Roth et al. |
| 2005/0138552 A1 | 6/2005 | Venolia |
| 2005/0138576 A1 | 6/2005 | Baumert et al. |
| 2005/0144157 A1 | 6/2005 | Moody et al. |
| 2005/0144241 A1 | 6/2005 | Stata et al. |
| 2005/0144284 A1 | 6/2005 | Ludwig et al. |
| 2005/0144568 A1 | 6/2005 | Gruen et al. |
| 2005/0144572 A1 | 6/2005 | Wattenberg et al. |
| 2005/0172262 A1 | 8/2005 | Lalwani |
| 2005/0177789 A1 | 8/2005 | Abbar et al. |
| 2005/0183008 A1 | 8/2005 | Crider et al. |
| 2005/0188043 A1 | 8/2005 | Cortright et al. |
| 2005/0203975 A1 | 9/2005 | Jindal et al. |
| 2005/0216863 A1 | 9/2005 | Schumacher et al. |
| 2005/0223066 A1 | 10/2005 | Buchheit et al. |
| 2005/0223329 A1 | 10/2005 | Schwartz et al. |
| 2005/0234910 A1 | 10/2005 | Buchheit et al. |
| 2005/0240902 A1 | 10/2005 | Bunker et al. |
| 2005/0251757 A1 | 11/2005 | Farn |
| 2005/0256867 A1 | 11/2005 | Walther et al. |
| 2005/0278656 A1 | 12/2005 | Goldthwaite et al. |
| 2005/0289109 A1 | 12/2005 | Arrouye et al. |
| 2005/0289154 A1 | 12/2005 | Weiss et al. |
| 2005/0289156 A1 | 12/2005 | Maryka et al. |
| 2006/0015816 A1 | 1/2006 | Kuehner et al. |
| 2006/0020962 A1 | 1/2006 | Stark |
| 2006/0026033 A1 | 2/2006 | Brydon et al. |
| 2006/0026213 A1 | 2/2006 | Yaskin et al. |
| 2006/0026242 A1 | 2/2006 | Kuhlmann et al. |
| 2006/0036580 A1 | 2/2006 | Stata |
| 2006/0036945 A1 | 2/2006 | Radtke et al. |
| 2006/0036946 A1 | 2/2006 | Radtke et al. |
| 2006/0036950 A1 | 2/2006 | Himberger et al. |
| 2006/0036964 A1 | 2/2006 | Satterfield et al. |
| 2006/0036965 A1 | 2/2006 | Harris et al. |
| 2006/0041545 A1 | 2/2006 | Heidloff et al. |
| 2006/0047644 A1 | 3/2006 | Bocking et al. |
| 2006/0053383 A1 | 3/2006 | Gauthier et al. |
| 2006/0064434 A1 | 3/2006 | Gilbert et al. |
| 2006/0069604 A1 | 3/2006 | Leukart et al. |
| 2006/0069686 A1 | 3/2006 | Beyda et al. |
| 2006/0080303 A1 | 4/2006 | Sargent et al. |
| 2006/0095865 A1 | 5/2006 | Rostom |
| 2006/0101051 A1 | 5/2006 | Carr et al. |
| 2006/0101350 A1 | 5/2006 | Scott |
| 2006/0111931 A1 | 5/2006 | Johnson et al. |
| 2006/0117249 A1 | 6/2006 | Hu et al. |
| 2006/0117302 A1 | 6/2006 | Mercer et al. |
| 2006/0129937 A1 | 6/2006 | Shafron |
| 2006/0132812 A1 | 6/2006 | Barnes et al. |
| 2006/0155689 A1 | 7/2006 | Blakeley et al. |
| 2006/0161849 A1 | 7/2006 | Miller et al. |
| 2006/0161863 A1 | 7/2006 | Gallo |
| 2006/0168522 A1 | 7/2006 | Bala |
| 2006/0173824 A1 | 8/2006 | Bensky |
| 2006/0173961 A1 | 8/2006 | Turski et al. |
| 2006/0218500 A1 | 9/2006 | Sauve et al. |
| 2006/0242557 A1 | 10/2006 | Nortis, III |
| 2006/0242575 A1 | 10/2006 | Winser |
| 2006/0248012 A1 | 11/2006 | Kircher et al. |
| 2006/0259449 A1 | 11/2006 | Betz et al. |
| 2006/0271869 A1 | 11/2006 | Thanu et al. |
| 2006/0271910 A1 | 11/2006 | Burcham et al. |
| 2006/0282817 A1 | 12/2006 | Darst et al. |
| 2006/0294452 A1 | 12/2006 | Matsumoto |
| 2006/0294526 A1 | 12/2006 | Hambrick et al. |
| 2007/0006206 A1 | 1/2007 | Dhanjal et al. |
| 2007/0033250 A1* | 2/2007 | Levin et al. ............ 709/204 |
| 2007/0050182 A1 | 3/2007 | Sneddon et al. |
| 2007/0050401 A1 | 3/2007 | Young et al. |
| 2007/0055936 A1 | 3/2007 | Dhanjal et al. |
| 2007/0055943 A1 | 3/2007 | McCormack et al. |
| 2007/0061306 A1 | 3/2007 | Pell et al. |
| 2007/0061307 A1 | 3/2007 | Hartwell et al. |
| 2007/0061308 A1 | 3/2007 | Hartwell et al. |
| 2007/0061738 A1 | 3/2007 | Taboada et al. |
| 2007/0106951 A1 | 5/2007 | McCormack et al. |
| 2007/0143662 A1 | 6/2007 | Carlson et al. |
| 2007/0143671 A1 | 6/2007 | Paterson et al. |
| 2007/0180040 A1* | 8/2007 | Etgen et al. ............ 709/207 |
| 2007/0185826 A1 | 8/2007 | Brice et al. |
| 2007/0203991 A1 | 8/2007 | Fisher et al. |
| 2007/0240057 A1 | 10/2007 | Satterfield et al. |
| 2007/0260996 A1 | 11/2007 | Jakobson |
| 2007/0279417 A1 | 12/2007 | Garg et al. |
| 2007/0282956 A1 | 12/2007 | Staats |
| 2007/0300168 A1 | 12/2007 | Bosma et al. |
| 2008/0005247 A9 | 1/2008 | Khoo |
| 2008/0005249 A1 | 1/2008 | Hart |
| 2008/0005686 A1 | 1/2008 | Singh |
| 2008/0034304 A1 | 2/2008 | Feuerbacher et al. |
| 2008/0040682 A1 | 2/2008 | Sorenson et al. |
| 2008/0046518 A1 | 2/2008 | Tonnison et al. |
| 2008/0052670 A1 | 2/2008 | Espinosa et al. |
| 2008/0077571 A1 | 3/2008 | Harris et al. |
| 2008/0104505 A1 | 5/2008 | Keohane et al. |
| 2008/0109787 A1 | 5/2008 | Wang Hui-Min et al. |
| 2008/0134138 A1 | 6/2008 | Chamieh et al. |
| 2008/0141242 A1 | 6/2008 | Shapiro |
| 2008/0155555 A1 | 6/2008 | Kwong |
| 2008/0178110 A1 | 7/2008 | Hill et al. |
| 2008/0244440 A1 | 10/2008 | Bailey |
| 2009/0007003 A1 | 1/2009 | Dukhon et al. |
| 2009/0012984 A1* | 1/2009 | Ravid et al. ............ 707/101 |
| 2009/0083656 A1 | 3/2009 | Dukhon et al. |
| 2009/0100009 A1 | 4/2009 | Karp |
| 2009/0106375 A1* | 4/2009 | Carmel et al. ............ 709/206 |
| 2009/0217192 A1 | 8/2009 | Dean et al. |
| 2009/0222763 A1 | 9/2009 | Dukhon et al. |
| 2009/0319619 A1 | 12/2009 | Affronti |
| 2009/0319911 A1 | 12/2009 | McCann |
| 2010/0011310 A1 | 1/2010 | Rainisto |
| 2010/0060645 A1 | 3/2010 | Garg et al. |

| | | | |
|---|---|---|---|
| 2010/0180226 A1 | 7/2010 | Satterfield et al. | |
| 2010/0191818 A1 | 7/2010 | Satterfield et al. | |
| 2010/0211889 A1 | 8/2010 | Durazo et al. | |
| 2010/0223575 A1 | 9/2010 | Leukart et al. | |
| 2010/0293470 A1 | 11/2010 | Zhao et al. | |
| 2011/0072396 A1 | 3/2011 | Giesen et al. | |
| 2011/0138273 A1 | 6/2011 | Radtke et al. | |
| 2011/0296322 A1 | 12/2011 | Dhanjal et al. | |
| 2012/0179993 A1 | 7/2012 | Himberger et al. | |
| 2012/0215866 A1 | 8/2012 | Satterfield et al. | |
| 2012/0324394 A1 | 12/2012 | Harris et al. | |
| 2013/0014048 A1 | 1/2013 | Satterfield et al. | |

FOREIGN PATENT DOCUMENTS

| | | |
|---|---|---|
| CN | 1746914 | 3/2006 |
| CN | 101243439 | 6/2012 |
| EP | 0 910 007 | 4/1999 |
| EP | 1 077 405 A2 | 2/2001 |
| EP | 1 104 151 | 5/2001 |
| EP | 1 672 518 | 6/2001 |
| EP | 1 223 503 | 7/2002 |
| EP | 1 376 337 | 2/2004 |
| EP | 1 462 999 A2 | 9/2004 |
| EP | 1 542 133 A2 | 6/2005 |
| EP | 1628197 | 2/2006 |
| EP | 1628199 | 2/2006 |
| EP | 1 835 434 A1 | 9/2007 |
| GB | 2329813 | 3/1999 |
| GB | 2382683 A | 6/2003 |
| GB | 2 391 148 | 1/2004 |
| ID | P 0027717 | 3/2011 |
| ID | P 0027754 | 3/2011 |
| ID | P0029297 | 10/2011 |
| JP | 03-043824 | 2/1991 |
| JP | 04-186425 | 7/1992 |
| JP | 04-312186 | 11/1992 |
| JP | 05-204579 | 8/1993 |
| JP | 06-052282 | 2/1994 |
| JP | 06-342357 | 12/1994 |
| JP | 10-074217 | 3/1998 |
| JP | 10-326171 | 12/1998 |
| JP | 11-175258 | 7/1999 |
| JP | 11-259200 | 9/1999 |
| JP | 2000-353130 A | 12/2000 |
| JP | 2001-034775 | 2/2001 |
| JP | 2001-0503893 | 3/2001 |
| JP | 2001-337944 | 12/2001 |
| JP | 2002-324055 A | 11/2002 |
| JP | 2003-015719 | 1/2003 |
| JP | 2003-101768 | 4/2003 |
| JP | 2003-216427 | 7/2003 |
| JP | 2003-256258 | 9/2003 |
| JP | 2003-256302 | 9/2003 |
| JP | 2003-308145 | 10/2003 |
| JP | 2004-078512 | 3/2004 |
| JP | 2004-086893 | 3/2004 |
| JP | 2004-102803 | 4/2004 |
| JP | 2004-512578 | 4/2004 |
| JP | 2004-145569 | 5/2004 |
| JP | 2004-159261 | 6/2004 |
| JP | 2004-185464 | 7/2004 |
| JP | 2004-318842 | 11/2004 |
| JP | 2004-342115 | 12/2004 |
| JP | 2005-31995 | 2/2005 |
| JP | 2005-032041 | 2/2005 |
| JP | 2005-115914 A | 4/2005 |
| JP | 2005-182353 | 7/2005 |
| JP | 2005-236089 | 9/2005 |
| JP | 4832024 | 9/2011 |
| JP | 5021185 | 6/2012 |
| JP | 5079701 | 9/2012 |
| JP | 5139984 | 11/2012 |
| KR | 10-2001-0091344 A | 10/2001 |
| KR | 10-0359378 B1 | 10/2002 |
| KR | 10-0388254 B1 | 6/2003 |
| KR | 10-2003-0072539 A | 9/2003 |
| KR | 10-2004-0071813 A | 8/2004 |
| KR | 10-2005-0023805 A | 3/2005 |
| KR | 10-2005-0036702 A | 4/2005 |
| KR | 10-1130421 | 3/2012 |
| KR | 10-1149960 | 5/2012 |
| KR | 10-1149990 | 5/2012 |
| KR | 10-1159334 | 6/2012 |
| MY | 146456 | 8/2012 |
| PH | 1-2005-000404 | 8/2011 |
| TW | 460839 | 10/2001 |
| TW | 490652 | 6/2002 |
| TW | 2003-05097 | 10/2003 |
| TW | I368852 | 7/2012 |
| WO | 92/21091 | 11/1992 |
| WO | 94/20921 | 9/1994 |
| WO | 96/10231 | 4/1996 |
| WO | 96/39654 | 12/1996 |
| WO | 98/20410 | 5/1998 |
| WO | WO 99/04353 A1 | 1/1999 |
| WO | WO 99/27495 | 6/1999 |
| WO | 01/55894 | 8/2001 |
| WO | WO 02/091162 A3 | 11/2002 |
| WO | WO 03/003240 A2 | 1/2003 |
| WO | 03/058519 A2 | 7/2003 |
| WO | WO 03/098500 | 11/2003 |
| WO | 2004-086250 A1 | 10/2004 |
| WO | WO 2007/033159 A1 | 3/2007 |
| WO | WO 2007/027737 A1 | 8/2007 |
| WO | WO 2008/121718 A1 | 10/2008 |
| WO | 2009-158151 | 12/2009 |
| WO | 2009-158171 | 12/2009 |
| WO | 2009-158172 | 12/2009 |
| ZA | 2010/07809 | 2/2012 |
| ZA | 2010/07810 | 2/2012 |

OTHER PUBLICATIONS

Yang, et al., "Email Categorization Using Fast Machine Learning Algorithms", 2002, 8 pages.

Islam, et al., "Email Categorization Using Multi-Stage Classification Technique", 2007, 8 pages.

International Search Report for PCT Application No. PCT/US2009/044292 mailed on Dec. 24, 2009, 4 pages.

Mexican Office Action dated May 26, 2011 cited in Appln. No. MX/a/2009/004151.

Korean Notice of Preliminary Rejection dated Jul. 22, 2011 cited in Appln No. 10-2005-0058160.

Korean Preliminary Rejection dated Aug. 23, 2011 cited in Appln. No. 10-2005-0067236.

Korean Preliminary Rejection dated Aug. 23, 2011 cited in Appln. No. 10-2005-0067411.

Korean Preliminary Rejection dated Aug. 29, 2011 cited in Appln. No. 10-2005-0066460.

Australian Office Action dated Aug. 31, 2011 cited in Appln. No. 2007255043.

3rd Official Notice, Mailing No. 134028, dated Sep. 16, 2001 cited in Appln. No. PH1707009.

4th Official Notice, Mailing No. 134052, dated Sep. 16, 2001 cited in Appln. No. PH1707009.

U.S. Official Action dated Sep. 13, 2011 in U.S. Appl. No. 12/372,386.

U.S. Official Action dated Sep. 14, 2011 in U.S. Appl. No. 12/163,758.

U.S. Appl. No. 13/027,289, filed Feb. 15, 2011 entitled "Floating Command Object".

U.S. Appl. No. 13/102,633, filed May 6, 2011 entitled "Markup Based Extensibility for User Interfaces".

Charles Rich et al., "Segmented Interaction History in a Collaborative Interface Agent," 1997, ACM, pp. 23-30.

Andrew Dwelly, "Functions and Dynamic User Interface," 1989, ACM, pp. 371-381.

Gordon Kurtenbach et al., "The Hotbox: Efficient Access to a Large Number of Menu-items," ACM, 1999, pp. 231-237, May 1999.

Charles Rich et al., "Adding a Collaborative Agent to Graphical User Interfaces," 1996, ACM, pp. 21-30.

Boyce, "Microsoft Outlook Inside Out," 2001, pp. 67, 68, 109, 110, 230, 231, 310, 316-318, 798.

Halvorson et al., "Microsoft Office XP Inside Out," 2001, pp. 1005-1009, 1015, 1023-1028, 1036-1039, 1093.

Riggsby et al., "Mastering Lotus Notes and Domino 6," 2003, pp. 135-139.

Riggsby et al., "Mastering Lotus Notes and Domino 6," 2003, pp. 135-138, 607-612.

Khare et al., "The Origin of (Document) Species," University of California, 1998, 9 pgs.

"Separate Structure and Presentation," http://www.webreference.com/html/tutorial5/1.html, Aug. 20, 1998, 4 pgs.

"The Style Attribute and CSS Declarations," http://www.webreference.com/html/tutorial5/2, Aug. 20, 1998, 4 pgs.

"What's Hot in Internet Services?" http://www.webreference.com/html/tutorial5/3, Aug. 20, 1998, 3 pgs.

"The Style Element & CSS Selectors," http://www.webreference.com/html/tutorial5/4.html, Aug. 20, 1998, 3 pgs.

http://www.webreference.com/html/tutorial5/5.html, Aug. 20, 1998, 3 pgs.

"ID & Class Selectors, Pseudoclasses," http://www.webreference.com/html/tutorial5/6.html, Aug. 20, 1998, 3 pgs.

http://www.webreference.com/html/tutorial5/7.html, Aug. 20, 1998, 3 pgs.

http://www.webreference.com/html/tutorial5/8.html, Aug. 20, 1998, 2 pgs.

"External Style Sheets," http://www.webreference.com/html/tutorial5/9.html, Aug. 20, 1998, 3 pgs.

Raman, "Cascaded Speech Style Sheets," 1997, 7 pgs.

"Primary Windows," Accessed at http://www-03.ibm.com/servers/eserver/iseries/navigator/guidelines/primary.html on Feb. 23, 2007, 23 pgs.

Schumaker, "User Interface Standards," http://msdn2.microsoft.com/en-us/library/aa217660(office.11.d=printer).aspx, Sep. 2001, 5 pgs.

Budinsky et al., "WebSphere Studio Overview," http://researchweb.watson.ibm.com/journal/sj/432/budinsky.html, May 6, 2004, 25 pgs.

Gordon Padwick, Using Microsoft Outlook 2000, Que, Sp. Ed., May 1999, 5 pp.

Becker et al., "Virtual Folders: Database Support for Electronic Messages Classification," Pontificia Universidade Catolica do Rio Grande do Sul, Porto Alegre, Brazil, pp. 163-170.

Goldberg et al., "Using Collaborative Filtering to Weave an Information Tapestry," Communication of the ACM, vol. 35, No. 12, pp. 61-70, Dec. 1992.

Liu et al., "Continual Queries for Internet Scale Event-Driven Information Delivery," IEEE Transactions on Knowledge and Data Engineering, vol. 11, Issue 1, pp. 610-628, 1999.

Chen et al., "NiagaraCQ: A Scalable Continuous Query System for Internet Databases," Int. Conf. On Management of Data, Proc. Of the 2000 ACM SIGMOD Int. Conf. on Management of Data, pp. 379-390, 2000.

Marshall School of Business: "Workshop IV—Calendar," http://www.marshall.usc.edu/computing/PDF_Files/Outlook/Workshop4, PDF, Apr. 10, 2000, pp. 1-4.

M. Williams, "Programming Windows NT4: Unleashed," Sams Publishing, Indianapolis, 1996, pp. index & 167-185.

"Microsoft Outlook 2000: Introduction to Calendar," Version Mar. 25, 2002, http://www.uakron.edu/its/learning/training/docs/Calendar032502.pdf, Mar. 25, 2002, pp. 1-52.

Screen Dumps of Microsoft Outlook (1999, pp. 1-3).

"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>, 6 pages.

"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>, 10 pages.

Microsoft Windows XP Professional, Version 2002, Service pack 2, 3 pgs.

Camarda, Using Microsoft Word 97, copyright 1997, QUE Corporation, pp. 412, 869.

Marshall School of Business, Workshop 1—Introduction to Outlook & E-mail, Apr. 6, 2000, pp. 1-11.

Jane Dorothy Calabria Burke, Ten Minute Guide to Lotus Notes 4.6, Publication date: Dec. 23, 1997, 2 pgs.

Bill Dyszel, Microsoft Outlook 2000 for Windows for Dummies, Copyright 1999, pp. 82-86, 102-103, 141,143.

Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.

Screen Dumps Microsoft Corporation, Microsoft Office Professional Edition 2003, 4 pp.

Screen Dumps Microsoft Corporation, Microsoft Office Professional Edition 2003, 5 pp.

Habraken, Microsoft Office XP 8 in 1, published Jun. 5, 2001, http://proquest.safaribooksonline.com/0789725096/, 12 pp.

Word 2002, Chapter 14; Paradigm Publishing Inc., copyright 2002; http://www.emcp.com/tech_tutorials/sig_irc/Signature_Word_Chapter_14.ppt, 21 pp.

Microsoft Office Word 2003, Part of Microsoft Office Professional Edition 2003, 1983-2003 Microsoft Corporation, 5 pp.

Microsoft Office 11 Beta Layperson's Specification, Copyright 2002, Microsoft Corporation, 28 pages.

FrontPage 11 Beta Layperson's Specification, Copyright 2002, Microsoft Corporation, 12 pages.

Office 11 Beta Letter, Copyright 2002, Microsoft Corporation, 6 pages.

Microsoft XDocs Beta Layperson Specification, Copyright 2002, Microsoft Corporation, 3 pages.

Microsoft Publisher 11 Beta Layperson's Specification, Copyright 2002, Microsoft Corporation, 13 pages.

Microsoft Office Word 2003, Part of Microsoft Office Professional Edition 2003, 1983-2003 Microsoft Corporation, screen shot 1, 1 pp.

Microsoft Office 2003, Microsoft Office Professional Edition 2003, Microsoft Corporation, 10 pages.

Screendumps—Microsoft Office, Microsoft Office Professional Edition 2003, Microsoft Corporation, 10 pages.

Screendumps—Microsoft Office Outlook, Microsoft Office Outlook Professional Edition 2003, Microsoft Corporation, 2 pages.

Nielsen, Jacob. "Tabs, Used Right," Alertbox, Sep. 17, 2007, http://www.useit.com/alertbox/tabs.html, 6 pages.

"Managing the Code Editor and View" Microsoft Corporation, http://msdn.microsoft.com/en-us/library/z01zks9a(VS.71),aspx, 2008, 3 pages.

Agarwal, Vikash K., "Creating a Visually Arresting User-Interface: A_3D Tab Control Example," Jan. 4, 2008, http://microsoft.apress.com/asptodayarchive/71723/creating-a-visually-arresting-user-interface-a-3d-tab-control-example, 12 pages.

"Omni Web Help," Omni Group, 2004, http://www.omnigroup.com/documentation/omniweb/browser/tabs.html, 2 pages.

Hepfner, Troy, "New SOCET CXP Interface Improves Usability," Sep. 2008, http://www.socetset.com/gxpmosaic/?p=95, 4 pages.

"Creating Charts: An Introduction," Excel for Chemists: .A Comprehensive Guide, E. Joseph Billo. http://www.ahut.edu.en/yxsz/ahk/Teaching/Excel%for%20Chemists/ChO2.pdf, 10 pages.

Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf, 7 pages.

"TeeChart for .NET Charting Control," Steema Software; accessed at: http://www.teechart.net/; accessed on Jan. 11, 2006, 4 pages.

Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.

Lisa K. Averett; Joshua R. Knisley; Mark A. Marvin; Haiti: Projecting Tactical Network and Systems Management; 1995 IEEE pp. 906-910.

"Convert to Word 2007," http://www.regencytraining.com/word-2007-conversion.html, Regency Training and Consulting, 2 pages (Date Printed Apr. 21, 2008).

"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).

"Inter-Widget Communication," http://web.mit.edu/6.115/www/miscfiles/amulet/amulet-help/IWC.htm, 6 pages (Feb. 13, 2007).

"The Technology in Document and Check Security," http://www.securedoc.in/thetechnology.htm, 7 pages (Date Printed Apr. 21, 2008).
Ando, R. et al., "Visualization-enabled multi-document summarization by Iterative Residual Rescaling," *Natural Language Engineering*, vol. 11, No. 1, pp. 67-86 (Mar. 2005) (2 page Abstract).
Bos, B, "Re: A proposal for addition to HTML 3.0: Frames," http://www.nyct.net/~aray/htmlwg/95q3/1141.html, 5 pages (Sep. 21, 1995).
de Candussio, N., "Common GUI Features Report," *Herschel CSDT Meeeting*, pp. 1-21 (Sep. 2007).
Krill, P., "Microsoft's Ribbon Interface Draws Frowns, Smiles," *InfoWorld*, http://www.infoworld.com/article/08/03/04/10NF-microsoft-fluentui_1.html, 3 pages (Mar. 4, 2008).
Rice, F, "Customizing the 2007 Office System Document Inspector," http://msdn2.microsoft.com/en-us/library/aa338203(d=printer).aspx, 10 pages (May 2006).
Boyce, "Microsoft Outlook Inside Out," 2001, pp. 133, 134, 721-728.
Halvorson et al., "Microsoft Office XP Inside Out," 2001, pp. 4, 5, 10, 11, 70-74, 281-288, 1010-1014.
Pogue, David. "Windows XP Home Edition: The Missing Manual," O'Reilly, 1st Edition, May 1, 2002, pp. 37, 38, 41.
Screendumps—Microsoft Office, Microsoft Corporation, Microsoft Office Professional Edition 2003, 13 pages.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].
Perronne et al. "Building Java Enterprise Systems with J2EE", Publisher: Sams, Pub Date: Jun. 7, 2000 (pp. 1-8).
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Microsoft Press, Microsoft Computer Dictionary, Microsoft Press, Fifth Edition, 2002, pp. 374, 382.
Riggsby, McCoy, Haberman and Falciani, "Mastering Lotus Notes and Domino 6." 2003, pp. 18, 22, 33-35, 47, 122, 123, 215-241, 378.
"About Google Desktop Search", http://www.desktop.google.com/about.html, Oct. 15, 2004, 8 pages.
Find any file or email on your PC as fast as you can type!, http://www.xl.com, 2003, 1 page.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
Screendumps—Microsoft Office (Microsoft Corporation, Microsoft Office Professional Edition 2003; 16 pages).
Clifton, The Application Automation layer—Using XML to Dynamically Generale GUI Elements—forms and controls, The Code Project, Jun. 2003, pp. 1-37.
ScreenShot of MS_Office_2003; (Microsoft Corporation, Microsoft Office Professional Edition 2003; 6 pages).
Halvorson et al., Microsoft Office Professional Official Manual, Aug. 20, 2002, 10 pgs.
Bellavista et al., "A Mobile Infrastructure for Terminal, User, and Resource Mobility", Network Operations and Management Symposium, NOMS 2000, pp. 877-890, IEEE/IFIP.
"Microsoft Office Professional Plus 2007", © 2006, Microsoft Corporation; 66 pgs.
Adler, "Emerging Standards for Component Software," Cybersquare, 1995 IEEE, 10 pgs.
Chamberland, et al., "IBM VisualAge for Java," vol. 37, No. 3, 1998, 26 pgs., http://researchweb.watson.ibm.com/journal/sj/373/chamberland.html [Accessed Feb. 6, 2007].

Zykov, "ConceptModeller: A Problem-Oriented Visual SDK for Globally Distributed Enterprise Systems." Proceedings of the 7th International Workshop on Computer Science and Information Technologies, CSIT 2005, 4 pgs.
"Create Office add-ins: ribbons, toolbars, taskpanes, menus etc.", http://www.add-in-express.com/creating-addins-blog/feed/, Jul. 4, 2007, 49 pages.
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx, 12 pages.
"What's New in Excel 2007", Feb. 26, 2007, 24 pages.
Whitechapel et al., "Microsot Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79-a91b-7f62eaae754a/VSTO2005SE_Tutorial.doc+This+tuiorial+focuses+on+the+new+features+introduced+in+VSTO+2005_SE&hl=en&ct=clnk&ed=3&gl=in, 19 pages.
"The New "Office 2007" User Interface", Microsoft Corporation © 2005, 32 pgs.
"The New Look in Office 12 / Office 2007", Office Watch, posted Sep. 20, 2005, 9 pgs.
Atwood, "Sometime a Word is Worth a Thousand Icons", Coding Horror, Feb. 22, 2006, 9 pgs.
Seo et al, "Hangul Office 2000 Tutoring Book", Sep. 15, 2000, 16 pgs.
Office 2007, Microsoft, Released on Nov. 6, 2006, 23 pgs.
The Discussion Board Component of Blackboard: An Instructor's Guide; Aug. 2004; 23 pgs.
Hock, "Yahoo! To the Max"; May 10, 2005; 5 excerpted pgs.
Homeworking Forum; archived Dec. 6, 2004; 11 pgs.
Gina Danielle Venolia et al., Supporting Email Workflow, revised Dec. 2001; 11 pgs.
"Look and Layout", retrieved at <<http://liv.ac.uk/csd/email/outlook/layout.htm>>, University of Liverpool, 9 pgs. ( 1826US01 Search Rpt).
"Preview Pane in Conversation: 4 pane view", 2005, Zinbra Inc., 3 pgs. ( 1826US01 Search Rpt).
"Reading Pane in Conversation View", retrieved at <<http://www.zimbra.com/forums/users/5918-reading-pane-conversation-view.html>>, 5 pgs. ( 1826US01 Search Rpt).
Ohmori, Yasuo et al., "Eigyo Mind—A Sales Support Tool," PFU Tech. Rev., vol. 10, No. 1, pp. 32-38, PFU Limited, May 1, 1999.
Danish Written Opinion Appl. No. SG 200504508-3 dated Sep. 18, 2006, all pages.
Danish Search Report Appl. No. SG 200504475-5 dated Sep. 19, 2006, all pages.
NZ Application No. 541301, Examination Report dated Jul. 25, 2005, all pages.
NZ Application No. 541300, Examination Report dated Jul. 25, 2005, all pages.
NZ Application No. 541299, Examination Report dated Jul. 25, 2005, all pages.
Australian Search Report dated Jan. 16, 2007 cited in Singapore Application No. 200504474-8, all pages.
PCT Written Opinion and Search Report dated Jan. 9, 2007 cited in International Application No. PCT/US2006/033809, all pages.
PCT Search Report dated Feb. 6, 2007 cited in International Application No. PCT/US2006/035467, all pages.
PCT Search Report dated Feb. 26, 2007 cited in International Application No. PCT/US2006/034993, all pages.
European Communicated dated Oct. 20, 2005 cited in EP Application No. 04102463.0/2211 PCT/, all pages.
Australian Written Opinion/Search Report cited in Singapore Application No. 200505257-6 mailed Feb. 12, 2007, all pages.
International Search Report dated Oct. 17, 2007 cited in International Application No. PCT/US2006/012724, all pages.
International Search Report dated Nov. 27, 2007 in PCT/US2007/012573, 9 pages.
Chinese First Office Action dated Mar. 21, 2008 cited in Appln No. 200510092146.4, all pages.

Chinese First Office Action dated Mar. 21, 2008 cited in Appln No. 200510092139.4, all pages.
Chinese First Office Action dated Apr. 11, 2008 cited in Appln No. 200510092141.1, all pages.
Chinese First Office Action dated Apr. 18, 2008 cited in Appln No. 200510092142.6, all pages.
Philippines Examiner's Action dated Apr. 21, 2008 cited in Appln No. 1-2005-000405, all pages.
Philippines Examiner's Action dated Apr. 21, 2008 cited in Appln No. 1-2005-000406, all pages.
Chilean Office Action dated Mar. 28, 2008 cited in Appln No. 1770-05, no English Translation, all pages.
Chinese First Office Action dated May 23, 2008 cited in Appln No. 200510089514.X, all pages.
European Summons to Attend Oral Proceedings dated Jun. 23, 2008 cited in Appln No. 04102463.9, all pages.
Philippines Examiner's Action dated Jul. 31, 2008 cited in Appln No. 12005000495, all pages.
Philippines Examiner's Action dated Aug. 19, 2008 cited in Appln No. 12005000405, all pages.
Philippines Examiner's Action dated Sep. 12, 2008 cited in Appln No. 1200500406, all pages.
Chinese Second Office Action dated Oct. 10, 2008 cited in Appln No. 200510092141.1, all pages.
Chinese Second Office Action dated Oct. 17, 2008 cited in Appln No. 200510092139.4, all pages.
Chinese Second Office Action dated Nov. 21, 2008 cited in Appln No. 200510089514.X, all pages.
European Search Report dated Nov. 25, 2008 cited in Application EP 06 79 0087, all pages.
Chilean Office Action dated Nov. 27, 2008 cited in Appln No. 1768-2005, all pages.
Chilean Office Action dated Sep. 23, 2008 cited in Appln No. 1770-2005, all pages.
Chilean Office Action dated Nov. 27, 2008 cited in Appln No. 1769-2005, all pages.
Mexican Office Action dated Feb. 5, 2009 cited in Appln No. PA/a/2005/008349, all pages.
Mexican Office Action dated Mar. 3, 2009 cited in Appln No. PA/a/2005/008351 English language only, all pages.
Chilean Second Office Action dated Mar. 4, 2009 cited in Appln No. 2512-2005, all pages.
European Office Action mailed Mar. 9, 2009, cited in Appln No. 06790087.8, all pages.
Chinese Office Action dated Apr. 3, 2009 cited in Appln No. 200510089514.X, all pages.
Supplementary European Search Report dated Jun. 9, 2009 cited in EP Application No. 07795391.7-1225, all pages.
Mexican Office Action dated Jun. 19, 2009 cited in Appln. No. PA/a/2005/007073, all pages.
Chinese Third Office Action dated Jun. 19, 2009 cited in Appln No. 200510092139.4, all pages.
Russian Office Action dated Jun. 24, 2009 cited in Appln No. 2005120363/28(023023), all pages.
Chinese Office Action dated Jul. 3, 2009 cited in Appln. No. 200680018095.3, all pages.
Russian Office Action dated Jul. 21, 2009 cited in Appln No. 2005125837/09(029011), all pages.
Russian Office Action dated Jul. 30, 2009 cited in Appln No. 2005125831/09(029005), all pages.
Israeli Office Action dated Sep. 6, 2009 cited in Appin No. 169716, all pages.
Israeli Office Action dated Sep. 7, 2009 cited in Appln No. 169718, all pages.
European Search Report dated Sep. 7, 2009 cited in EP Application No. 09006972.5-2211, all pages.
Russian Office Action dated Sep. 10, 2009 cited in Appln No. 2005125836/09(029010), all pages.
Russian Office Action dated Sep. 10, 2009 cited in Appln No. 2005125839/09(029013), all pages.
European Communication dated Sep. 14, 2009 cited in Appln No. 07795391.07-1225, all pages.
European Communication dated Sep. 28, 2009 cited in Appln No. 09006972.05-2211, all pages.
Israeli Office Action dated Oct. 12, 2009 cited in Appln No. 170668, all pages.
New Zealand Office Action dated Oct. 14, 2009 cited in NZ Application No. 566363, all pages.
Chinese Office Action dated Oct. 16, 2009 cited in Appln No. 200510092142.6, all pages.
Russian Office Action dated Oct. 26, 2009 cited in Appln No. 2005120363/09(023023), all pages.
Russian Office Action dated Oct. 30, 2009 cited in Appln No. 2005125837/09(029011), all pages.
Chilean Second Office Action dated Nov. 4, 2009 cited in Appln No. 1770-2005, all pages.
Chinese Office Action dated Nov. 27, 2009 cited in Appln No. 200680033212.3, all pages.
PCT Search Report and Written Opinion dated Nov. 30, 2009 cited in International Application No. PCT/US2009/046341, all pages.
Chilean Second Office Action dated Dec. 4, 2009 cited in Appln No. 1768-2005, all pages.
Russian Office Action dated Dec. 28, 2009 cited in Appln No. 2005125836/09(029010), all pages.
PCT Search Report and Written Opinion dated Dec. 29, 2009 cited in International Application No. PCT/US2009/046344, all pages.
Chinese Office Action dated Jan. 22, 2010 cited in Appln No. 200680032564.7, all pages.
Chilean Second Office Action dated Jan. 29, 2010 cited in Appln No. 1769-2005, all pages.
Chinese Third Office Action dated Feb. 12, 2010 cited in Appln No. 200510092142.6, all pages.
Philippines Examiner's Action dated Mar. 11, 2010 cited in Appln No. 1-2005-000405, all pages.
Chinese Office Action dated Mar. 11, 2010 cited in Appln No. 200780020312.7, all pages.
Australian Office Action dated Mar. 25, 2010 cited in Appln No. 2005203411, all pages.
Australian Office Action dated Mar. 25, 2010 cited in Appln No. 2005203412, all pages.
Australian Office Action dated Mar. 26, 2010 cited in Appln No. 2005203409, all pages.
Australian Office Action dated Apr. 8, 2010 cited in Appln No. 2005203410, all pages.
Mexican Office Action dated May 4, 2010 cited in Appln No. 2005/008354, all pages.
Australian Office Action dated May 28, 2010 cited in Appln No. 2005202717, all pages.
European Office Action dated Jun. 15, 2010 cited in EP Application No. 06814358.5, all pages.
Israeli Office Action dated Jul. 5, 2010 cited in Appln No. 169718, all pages.
Chinese Second Office Action dated Jul. 6, 2010 cited in Appln No. 200680033212.3, all pages.
Russian Office Action dated Jul. 26, 2010 cited in RU Application No. 2008109034, w/translation, all pages.
Mexican Office Action dated Aug. 12, 2010 cited in Appln No. 2005/008354, all pages.
PCT Written Opinion and Search Report dated Sep. 2, 2010 cited in International Application No. PCT/US2010/021888, all pages.
Malaysian Substantive Examination Adverse Report dated Sep. 30, 2010 cited in Appln No. PI 20052959, all pages.
Australian Office Action dated Oct. 21, 2010 cited in Appln No. 2006284908, all pages.
Israeli Office Action dated Oct. 28, 2010 cited in Appln No. 169716, all pages.
Chinese Second Office Action dated Oct. 29, 2010 cited in Appln No. 200680030421.2, all pages.
Chinese Office Action dated Nov. 11, 2010 cited in CN Application No. 200680032789.2, w/translation, all pages.
Russian Office Action dated Nov. 12, 2010 cited in Application No. 2008109034, w/translation, all pages.
PCT Written Opinion and Search Report dated Nov. 29, 2010 cited in International Application No. PCT/US2010/034277, all pages.

Mexican Office Action dated Jan. 6, 2011 cited in Appln No. PA/a/2005/008354, all pages.
Australian OA dated Jan. 17, 2011 cited in Application No. 2006287408, all pages.
Notice on Reexamination dated Jan. 21, 2011 cited in Appln No. 200510089514.X, all pages.
Chinese Third Office Action dated Feb. 10, 2011 cited in Appln No. 200680033212.3, all pages.
Egypt Official Decision dated Mar. 14, 2011 cited in Appln No. 2005080371, all pages.
Malaysian Substantive Examination Adverse Report dated Mar. 15, 2011 cited in Appln No. PI 20053260, all pages.
2nd Notice on Reexamination dated Mar. 25, 2011 cited in Appln No. 200510089514.X, all pages.
Mexican Office Action dated Mar. 31, 2011 cited in Appln No. PA/a/2005/008351, all pages.
Mexican Office Action dated Mar. 31, 2011 cited in Appln No. PA/a/2005/008349, all pages.
Mexican Office Action dated Mar. 31, 2011 cited in Appln No. PA/a/2005/008350, all pages.
Chinese Second Office Action dated Apr. 7, 2011 cited in Application No. 200680032789.2, w/translation, all pages.
Philippines Examiner's Action dated Apr. 12, 2011 cited in Appln No. 1-2005-00404, all pages.
Japanese Notice of Rejection dated May 6, 2011 cited in Appln. No. 2005-236089, all pages.
Japanese Notice of Rejection dated May 6, 2011 cited in Appln. No. 2005-236087, all pages.
Korean Notice of Rejection dated May 17, 2011 cited in Appln No. 10-2004-48176, all pages.
Chinese Second Office Action dated May 19, 2011 cited in Appln No. 200780020312.7, all pages.
Japanese Office Action dated Jun. 10, 2011 cited in JP Application No. 2008-530229, w/translation, all pages.
Russian Office Action dated Jun. 14, 2011 cited in Appln No. 2008147090, all pages.
Chinese Third Office Action dated Jun. 21, 2011 cited in Appln No. 200680030421.2, all pages.
Chinese Second Office Action dated Jul. 14, 2011 cited in Appln No. 20680018095.3, all pages.
Chinese Decision on Rejection dated Jul. 21, 2011 cited in Appln No. 20068032789.2, all pages.
Japanese Notice of Rejection dated Aug. 12, 2011 cited in Appln. No. 2005-184990, all pages.
U.S. Official Action dated Dec. 23, 2003 in U.S. Appl. No. 09/896,384, all pages.
U.S. Official Action dated Apr. 27, 2006 in U.S. Appl. No. 10/800,056, all pages.
U.S. Final Official Action dated Oct. 19, 2006 in U.S. Appl. No. 10/800,056, all pages.
U.S. Official Action dated Apr. 12, 2007 in U.S. Appl. No. 10/851,506, all pages.
U.S. Official Action dated Jun. 4, 2007 in U.S. Appl. No. 10/955,940, all pages.
U.S. Official Action dated Jul. 26, 2006 in U.S. Appl. No. 10/741,407, all pages.
U.S. Final Official Action dated Jan. 23, 2007 in U.S. Appl. No. 10/741,407, all pages.
U.S. Official Action dated Jan. 4, 2007 in U.S. Appl. No. 10/607,020, all pages.
U.S. Official Action dated Jun. 14, 2007 in U.S. Appl. No. 10/836,154, all pages.
U.S. Official Action dated Jun. 21, 2007 in U.S. Appl. No. 10/955,928, all pages.
U.S. Official Action dated Jul. 11, 2007 in U.S. Appl. No. 10/955,941, all pages.
U.S. Official Action dated Jul. 11, 2007 in U.S. Appl. No. 10/955,967, all pages.
U.S. Official Action dated Jul. 11, 2007 in U.S. Appl. No. 10/955,942, all pages.
U.S. Official Action dated Jul. 13, 2007 in U.S. Appl. No. 10/800,056, all pages.
U.S. Official Action dated Sep. 6, 2007 in U.S. Appl. No. 11/136,800, all pages.
U.S. Official Action dated Sep. 26, 2007 in U.S. Appl. No. 11/151,686, all pages.
U.S. Official Action dated Oct. 9, 2007 in U.S. Appl. No. 10/982,073, all pages.
U.S. Official Action dated Dec. 4, 2007 in U.S. Appl. No. 10/955,940, all pages.
U.S. Official Action dated Dec. 21, 2007 in U.S. Appl. No. 10/851,506, all pages.
U.S. Official Action dated Dec. 28, 2007 in U.S. Appl. No. 10/800,056, all pages.
U.S. Official Action dated Jan. 8, 2008 in U.S. Appl. No. 10/955,928, all pages.
U.S. Official Action dated Jan. 28, 2008 in U.S. Appl. No. 10/836,154, all pages.
U.S. Official Action dated Feb. 20, 2008 in U.S. Appl. No. 10/848,774, all pages.
U.S. Official Action dated Feb. 21, 2008 in U.S. Appl. No. 10/851,442, all pages.
U.S. Official Action dated Feb. 22, 2008 in U.S. Appl. No. 11/445,393, all pages.
U.S. Official Action dated Apr. 15, 2008 in U.S. Appl. No. 10/955,942, all pages.
U.S. Official Action dated Apr. 16, 2008 in U.S. Appl. No. 10/955,967, all pages.
U.S. Official Action dated Apr. 29, 2008 in U.S. Appl. No. 10/955,941, all pages.
U.S. Official Action dated May 28, 2008 in U.S. Appl. No. 10/982,073, all pages.
U.S. Official Action dated May 30, 2008 in U.S. Appl. No. 11/430,562, all pages.
U.S. Official Action dated Jun. 19, 2008 in U.S. Appl. No. 10/851,506, all pages.
U.S. Official Action dated Jun. 20, 2008 in U.S. Appl. No. 10/955,928, all pages.
U.S. Official Action dated Jun. 27, 2008 in U.S. Appl. No. 11/430,416, all pages.
U.S. Official Action dated Jul. 9, 2008 in U.S. Appl. No. 11/136,800, all pages.
U.S. Official Action dated Jul. 17, 2008 in U.S. Appl. No. 10/955,940, all pages.
U.S. Official Action dated Jul. 24, 2008 in U.S. Appl. No. 11/151,686, all pages.
U.S. Official Action dated Oct. 8, 2008 in U.S. Appl. No. 11/445,393, all pages.
U.S. Official Action dated Oct. 28, 2008 in U.S. Appl. No. 11/151,686, all pages.
U.S. Official Acton dated Nov. 13, 2008 in U.S. Appl. No. 11/430,562, all pages.
U.S. Official Action dated Nov. 25, 2008 in U.S. Appl. No. 11/154,278, all pages.
U.S. Official Action dated Dec. 11, 2008 in U.S. Appl. No. 10/982,073, all pages.
U.S. Official Action dated Dec. 23, 2008 in U.S. Appl. No. 10/955,942, all pages.
U.S. Official Action dated Dec. 24, 2008 in U.S. Appl. No. 10/955,967, all pages.
U.S. Official Action dated Jan. 6, 2009 in U.S. Appl. No. 10/955,941, all pages.
U.S. Official Action dated Jan. 9, 2009 in U.S. Appl. No. 11/430,561, all pages.
U.S. Official Action dated Mar. 18, 2009 in U.S. Appl. No. 11/401,470, all pages.
U.S. Official Action dated Apr. 7, 2009 in U.S. Appl. No. 10/955,940, all pages.
U.S. Official Action dated Apr. 28, 2009 in U.S. Appl. No. 12/028,797, all pages.
U.S. Official Action dated Jun. 1, 2009 in U.S. Appl. No. 11/445,393, all pages.
U.S. Official Action dated Jun. 8, 2009 in U.S. Appl. No. 10/982,073, all pages.

U.S. Official Action dated Jun. 10, 2009 in U.S. Appl. No. 11/154,278, all pages.
U.S. Official Action dated Jun. 11, 2009 in U.S. Appl. No. 11/151,686, all pages.
U.S. Official Acton dated Jun. 19, 2009 in U.S. Appl. No. 11/430,562, all pages.
U.S. Official Action dated Jun. 24, 2009 in U.S. Appl. No. 10/607,020, all pages.
U.S. Official Action dated Aug. 4, 2009 in U.S. Appl. No. 10/955,967, all pages.
U.S. Official Action dated Aug. 4, 2009 in U.S. Appl. No. 10/955,942, all pages.
U.S. Official Action dated Aug. 17, 2009 in U.S. Appl. No. 11/430,561, all pages.
U.S. Official Action dated Aug. 18, 2009 in U.S. Appl. No. 11/782,059, all pages.
U.S. Official Action dated Sep. 15, 2009 in U.S. Appl. No. 11/217,071, all pages.
U.S. Official Action dated Sep. 23, 2009 in U.S. Appl. No. 11/401,470, all pages.
U.S. Official Action dated Oct. 5, 2009 in U.S. Appl. No. 11/332,822, all pages.
U.S. Official Action dated Nov. 13, 2009 in U.S. Appl. No. 11/154,278, all pages.
U.S. Official Action dated Nov. 24, 2009 in U.S. Appl. No. 11/445,393, all pages.
U.S. Official Action dated Dec. 8, 2009 in U.S. Appl. No. 11/151,686, all pages.
U.S. Official Action dated Dec. 9, 2009 in U.S. Appl. No. 12/028,797, all pages.
U.S. Official Action dated Dec. 10, 2009 in U.S. Appl. No. 10/955,940, all pages.
U.S. Official Action dated Jan. 6, 2010 in U.S. Appl. No. 10/607,020, all pages.
U.S. Official Acton dated Jan. 7, 2010 in U.S. Appl. No. 11/430,562, all pages.
U.S. Official Action dated Jan. 20, 2010 in U.S. Appl. No. 10/955,967, all pages.
U.S. Official Action dated Jan. 25, 2010 in U.S. Appl. No. 10/982,073, all pages.
U.S. Official Action dated Feb. 18, 2010 in U.S. Appl. No. 11/782,059, all pages.
U.S. Official Action dated Feb. 19, 2010 in U.S. Appl. No. 10/955,942, all pages.
U.S. Official Action dated Feb. 22, 2010 in U.S. Appl. No. 11/401,470, all pages.
U.S. Official Action dated Mar. 30, 2010 in U.S. Appl. No. 11/217,071, all pages.
U.S. Official Action dated Apr. 15, 2010 in U.S. Appl. No. 11/823,999, all pages.
U.S. Official Action dated May 5, 2010 in U.S. Appl. No. 10/851,506, all pages.
U.S. Official Action dated May 25, 2010 in U.S. Appl. No. 10/607,020, all pages.
U.S. Official Action dated Jun. 3, 2010 in U.S. Appl. No. 12/028,797, all pages.
U.S. Official Acton dated Jun. 22, 2010 in U.S. Appl. No. 11/430,562, all pages.
U.S. Official Action dated Jun. 23, 2010 in U.S. Appl. No. 10/955,940, all pages.
U.S. Official Action dated Jun. 25, 2010 in U.S. Appl. No. 11/332,822, all pages.
U.S. Official Action dated Jul. 1, 2010 in U.S. Appl. No. 11/782,059, all pages.
U.S. Official Action dated Jul. 6, 2010 in U.S. Appl. No. 10/955,967, all pages.
U.S. Official Action dated Aug. 2, 2010 in U.S. Appl. No. 10/955,942, all pages.
U.S. Official Action dated Aug. 6, 2010 in U.S. Appl. No. 11/401,470, all pages.
U.S. Official Action dated Sep. 21, 2010 in U.S. Appl. No. 11/217,071, all pages.
U.S. Official Action dated Sep. 27, 2010 in U.S. Appl. No. 10/836,154, all pages.
U.S. Official Action dated Nov. 9, 2010 in U.S. Appl. No. 10/607,020, all pages.
U.S. Official Action dated Nov. 22, 2010 in U.S. Appl. No. 11/782,059, all pages.
U.S. Official Action dated Nov. 26, 2010 in U.S. Appl. No. 12/753,923, all pages.
U.S. Official Action dated Dec. 8, 2010 in U.S. Appl. No. 10/851,506, all pages.
U.S. Official Action dated Dec. 8, 2010 in U.S. Appl. No. 10/955,967, all pages.
U.S. Official Action dated Dec. 16, 2010 in U.S. Appl. No. 11/430,562, all pages.
U.S. Official Action dated Dec. 20, 2010 in U.S. Appl. No. 11/445,393, all pages.
U.S. Official Action dated Dec. 20, 2010 in U.S. Appl. No. 12/574,256, all pages.
U.S. Official Action dated Dec. 29, 2010 in U.S. Appl. No. 12/028,787, all pages.
U.S. Official Action dated Jan. 5, 2011 in U.S. Appl. No. 11/823,999, all pages.
U.S. Official Action dated Jan. 6, 2011 in U.S. Appl. No. 12/142,927, all pages.
U.S. Official Action dated Feb. 1, 2011 in U.S. Appl. No. 11/332,822, all pages.
U.S. Official Action dated Feb. 11, 2011 in U.S. Appl. No. 11/401,470, all pages.
U.S. Official Action dated Mar. 14, 2011 in U.S. Appl. No. 12/163,784, all pages.
U.S. Official Action dated Apr. 21, 2011 in U.S. Appl. No. 11/445,393, all pages.
U.S. Official Action dated Apr. 21, 2011 in U.S. Appl. No. 12/574,256, all pages.
U.S. Official Action dated May 5, 2011 in U.S. Appl. No. 10/836,154, all pages.
U.S. Official Action dated May 12, 2011 in U.S. Appl. No. 12/753,923, all pages.
U.S. Official Action dated May 19, 2011 in U.S. Appl. No. 11/430,562, all pages.
U.S. Official Action dated May 19, 2011 in U.S. Appl. No. 10/851,506, all pages.
U.S. Official Action dated Jun. 7, 2011 in U.S. Appl. No. 11/332,822, all pages.
U.S. Official Action dated Jun. 9, 2011 in U.S. Appl. No. 12/464,584, all pages.
U.S. Official Action dated Jul. 8, 2011 in U.S. Appl. No. 11/401,470, all pages.
U.S. Official Action dated Jul. 8, 2011 in U.S. Appl. No. 12/163,784, all pages.
U.S. Official Action dated Aug. 3, 2011 in U.S. 12/142,927, all pages.
U.S. Appl. No. 13/437,031, filed Apr. 2, 2012 entitled "Automatic Grouping of Electronic Mail", all pages.
U.S. Appl. No. 13/427,939, filed Mar. 23, 2012 entitled "An Improved User Interface for Displaying a Gallery of Formatting Options Applicable to a Selected Object", all pages.
Dr. Dobb's Journal; "Windows 95 Common Controls"; May 1, 1995; 12 pgs.
Aoyagi, Hideo, "Mail Mac Fan Special 33"; Manichi Communications Inc., Mar. 1, 2004, 5 pgs.
Morita, Utako; "Literature Searching System, 'JDream'"; Online Search; vol. 23, No. 4; The Society of Japan Terminal, Dec. 2002; 5 pgs.
Milstein, Sarah; "The Missing Manual: The book that should have been in the box", First Edition; O'Reilly Japan, Inc.; Nov. 25, 2004; 1 pg.
Cole; "New Arrival! Forefront of Downloading"; Mac People; vol. 11, No. 10; ASCII Corporation; Aug. 31, 2005; 1 pg.
Sada, Morihiro; "Clue for Managing Common Data Filed on Server"; Business Personal Computer Age; vol. 15, No. 7; Dempa Publications, Inc.; Jul. 1, 1997; 1 pg.
Douglas et al., "Dynamic Popup Menu Titles"; IP.Com Journal, IP.Com Inc., West Henrietta, NY, Aug. 1, 1992, 2 pgs.

Haden et al.; "Scrollable Popup Menu with Selection Tracking Display of Graphical Objects"; IP.Com Journal, IP.COM Inc., West Henrietta, NY, Aug. 1, 1994, 6 pgs.
"Index Card Metaphor for Multiple Property Sheets Associated with a Given Object"; IBM Technical Disclosure Bulletin, International Business Machines Corp., vol. 33, No. 3A, Aug. 1, 1990, 2 pgs.
"Menu Selection Method for Related Attributes"; IBM Technical Disclosure Bulletin, International Business Machines Corp., vol. 33, No. 6B, Nov. 1990, 3 pgs.
Ribbons; Microsoft; © 2012 Microsoft; http://msdn.microsoft.com/en-us/library/windows/desktop/cc872782.aspx; 45 pgs.
AutoCAD 2011—Customization Guide; Feb. 2010; Autodesk, Inc.; http://images.autodesk.com/adsk/files/acad_acg.pdf; 554 pgs.
Mexican Office Action Summary dated Sep. 22, 2011 cited in Appln. No. MX/A/2008/003342, 10 pages.
Korean Notice of Rejection dated Nov. 3, 2011 cited in Appln No. 10-2005-0067257, 4 pages.
Japanese Notice of Rejection dated Nov. 4, 2011 cited in Appln No. 2008-513476, 4 pages.
Japanese Notice of Rejection dated Nov. 11, 2011 cited in Appln. No. 2008-530229, 58 pages.
Chinese Office Action dated Nov. 18, 2011 cited in Appln. No. 200910148820.4, 10 pages.
Japanese Notice of Rejection dated Nov. 25, 2011 cited in Appln. No. 2008-531249, 8 pages.
Chinese Office Action dated Nov. 29, 2011 cited in Appln. No. 200980124383.0, 9 pages.
Chinese Third Office Action dated Dec. 5, 2011 cited in Appln. No. 200680018095.3, 6 pages.
European Search Report dated Dec. 6, 2011 cited in Appln No. 06803424.8, 8 pages.
Japanese Notice of Rejection dated Dec. 16, 2011 cited in Appln No. 2008-529218, 3 pages.
Korean Notice of Rejection dated Jan. 30, 2012 cited in Appln No. 10-2004-0048176, 5 pages.
Malaysian Substantive Examination Adverse Report dated Jan. 31, 2012 cited in Appln No. PI 20053258, 3 pages.
Malaysian Substantive Examination Adverse Report dated Jan. 31, 2012 cited in Appln No. PI 20053259, 3 pages.
Chinese Decision on Reexamination dated Feb. 1, 2012 cited in Appln No. 200510089514.X, 23 pages.
Japanese Notice of Rejection dated Feb. 3, 2012 cited in Appln No. 2008-530218, 6 pages.
European Search Report dated Feb. 10, 2012 cited in Appln No. 05107153.8, 8 pages.
European Search Report dated Feb. 15, 2012 cited in Appln No. 05107157.9, 8 pages.
European Search Report dated Feb. 28, 2012 cited in Appln No. 05107184.3, 8 pages.
Chinese Office Action dated Feb. 29, 2012 cited in Appln No. 200980124664.9, 9 pages.
Chinese Decision on Rejection dated Mar. 7, 2012 cited in Appln No. 200780020312.7, 5 pages.
Chinese Second Office Action dated Mar. 9, 2012 cited in Appln No. 200980124383.0, 10 pages.
Japanese Notice of Final Rejection dated Mar. 9, 2012 cited in Appln No. 2008-513476, 2 pages.
Taiwan Search Report dated Mar. 14, 2012 cited in Appln No. 094123420, 7 pages.
European Search Report dated Mar. 16, 2012 cited in Appln No. 05107186.6, 8 pages.
Taiwan Notice of Allowance dated Mar. 29, 2012 cited in Appln No. 10120306600, 6 pages.
Chilean Office Action dated Mar. 29, 2012 cited in Appln No. 1560-2010, 5 pages.
Chilean Office Action dated Mar. 29, 2012 cited in Appln No. 1559-2010, 5 pages.
India First Examination Report dated Mar. 30, 2012 cited in Appln No. 1817/DEL/2005, 2 pages.
Japanese Notice of Allowance dated Apr. 11, 2012 cited in Appln No. 2008-530229, 6 pages.
U.S. Official Action dated Jan. 12, 2012 in U.S. Appl. No. 11/782,059, 45 pages.
U.S. Official Action dated Jan. 26, 2012 in U.S. Appl. No. 12/464,584, 32 pages.
U.S. Official Action dated Feb. 27, 2012 in U.S. Appl. No. 12/372,386, 41 pages.
U.S. Official Action dated Mar. 14, 2012 in U.S. Appl. No. 12/142,927, 49 pages.
U.S. Official Action dated Apr. 5, 2012 in U.S. Appl. No. 12/163,758, 28 pages.
U.S. Official Action dated Apr. 19, 2012 in U.S. Appl. No. 13/102,633, 90 pages.
International Search Report mailed Nov. 30, 2009, Application No. PCT/US2009/044059, 11 pages.
Russel et al., (hereinafter "Russel"); "Special Edition Using Microsoft ® Office Outlook ® 2003"; Que publishing on Sep. 25, 2003, 71 pgs. 71 pages.
Israeli Office Action dated May 3, 2012 cited in Appln No. 169718, 4 pages.
Taiwan Office Action dated May 14, 2012 cited in Appln No. 94122180, with Eng Lang Summary, 5 pages.
Mexican Office Action dated Jun. 6, 2012 cited in Appln No. MX/a/2008/014849, 8 pages.
Chinese Second Office Action dated Jun. 18, 2012 in Appln No. 200910148820.4, 6 pages.
Mexican Office Action dated Jun. 25, 2012 in Appln No. PA/a/2005/008354, 25 pages.
U.S. Official Action dated Jun. 6, 2012 in U.S. Appl. No. 12/777,287, 98 pages.
Chinese Office Action dated Jul. 2, 2012 in Appln No. 200980124944.7, 8 pages.
Chinese Office Action dated Jul. 12, 2012 in Appln No. 201080008789.5, 8 pages.
U.S. Official Action dated Jun. 19, 2012 in U.S. Appl. No. 12/769,787, 94 pages.
Mexican Office Action dated Oct. 3, 2011 cited in Appln. No. MX/a/2008/014849.
U.S. Appl. No. 13/464,572, filed May 4, 2012 entitled "Accessing an Out-Space User Interface for a Document Editor Program", all pages.
Changing a Graph Type: Ultimate Illustration of Excel 2002 for Windows XP, General Book, X-media Corp., Aug. 31, 2002, p. 224.
Mexican Office Action dated Feb. 3, 2012 cited in Appln No. MX/a/2008/002889 with summary, 12 pages.
Taiwan Office Action dated Feb. 8, 2012 cited in Appln No. 94123640, with Eng Lang Summary, 15 pages.
Israeli Office Action dated Feb. 23, 2012 cited in Appln No. 170668, 20 pages.
Chinese Fourth Office Action dated Apr. 27, 2012 cited in Appln No. 200680018095.3, 8 pages.
Japanese Notice of Rejection dated May 11, 2012 cited in Appln No. 2009-513223, 6 pages.
U.S. Official Action dated Apr. 26, 2012 in U.S. Appl. No. 11/782,059, 35 pages.
U.S. Appl. No. 13/595,084, filed Aug. 27, 2012 entitled "Command User Interface for Displaying Selectable Software Functionality Controls".
Redmond, Tony; Excerpt from Book; Microsoft Exchange Server 2003; Published 2003; 14 pgs. (provided to M&G Aug. 9, 2012 by Microsoft).
Korean Notice of Preliminary Rejection dated Jul. 2, 2012 cited in Appln No. 10-2012-0024393, 5 pages.
Korean Notice of Preliminary Rejection dated Jul. 19, 2012 cited in Appln No. 10-2007-7024571, 6 pages.
Chinese Decision on Rejection dated Jul. 31, 2012 cited in Appln No. 200680018095.3, 17 pages.
Chinese Office Action dated Aug. 2, 2012 in Appln No. 200980124945.1, 8 pages.
Chinese Third Office Action dated Aug. 14, 2012 in Appln No. 200980124383.0, 8 pages.
U.S. Official Action dated Oct. 25, 2011 in U.S. Appl. No. 12/144,642, 45 pages.
U.S. Official Action dated Nov. 2, 2011 in U.S. Appl. No. 10/836,154, 26 pages.

U.S. Appl. No. 13/615,668, filed Sep. 14, 2012 entitled "User Interface for Displaying Selectable Software Functionality Controls that are Relevant to a Selected Object".
Mexican Office Action Summary dated Jun. 25, 2012 in Appln No. PA/a/2005/008354, 25 pages.
Malaysian Examination Report dated Aug. 30, 2012 in Appln No. PI 20080400, 3 pages.
Chinese Second Office Action dated Sep. 12, 2012 in Appln No. 200980124944.7, 13 pages.
Mexican Office Action Summary dated Sep. 18, 2012 in Appln No. MX/a/2008/003342, 8 pages.
Chilean Office Action dated Sep. 21, 2012 cited in Appln No. 1560-2010, w/English Language Summary, 8 pages.
EP Communication dated Sep. 26, 2012 cited in Appln No. PCT/US2006/034993, 10 pages.
U.S. Official Action dated Aug. 7, 2012 in U.S. Appl. No. 10/836,154, 41 pages.
U.S. Official Action dated Sep. 11, 2012 in U.S. Appl. No. 12/163,784, 49 pages.
U.S. Official Action dated Sep. 13, 2012 in U.S. Appl. No. 13/437,031, 79 pages.
Mexican Office Action Summary dated May 7, 2012 in Appln No. MX/a/2008/003342, 8 pages.
"NEO Pro—the total "find that email" solution!"; http://www.caelo.com/products/learn/, 2004, 1 page.
"VisNetic MailFlow"; http://www.deerfield.com/products/visnetic-mailflow/, 2005, 1 page.
U.S. Official Action dated Oct. 24, 2012 in U.S. Appl. No. 13/102,633, 41 pages.
Korean Notice of Preliminary Rejection dated Nov. 12, 2012 cited in KR-10-2008-7005939, 7 pages.
Canadian Office Action dated Nov. 23, 2012 cited in Appln No. 2,512,102, 5 pages.
Canadian Office Action dated Nov. 29, 2012 cited in Appln No. 2,512,047, 4 pages.
Chinese Second Office Action dated Dec. 17, 2012 cited in Appln No. 200980124644.9, 10 pages.
U.S. Official Action dated Nov. 23, 2012 in U.S. Appl. No. 11/782,059, 49 pages.
U.S. Official Action dated Dec. 5, 2012 in U.S. Appl. No. 12/777,287, 36 pages.
Microsoft Office 2007 Word Help, 3 pgs.
Alexander, Keeping New Messages Marked 'Unread' (2007), http://certcities.com/editorial/colums/story.asp?EditorialsD=243, 2 pgs.
Wiley, Microsoft® Office Outlook® 2007 for Dummies®, 9 pgs.
Chilean Second Office Action dated Nov. 21, 2012 cited in Appln No. 1559-2010, 6 pages.
Russian Office Action dated Dec. 12, 2012 cited in Appln No. 2010140069, 8 pages.
Chinese Third Office Action dated Dec. 31, 2012 in Appln No. 200980124944.7, 14 pages.
Chinese Second Office Action dated Dec. 31, 2012 in Appln No. 200980124945.1, 8 pages.
Chinese Second Office Action dated Jan. 4, 2013 in Appln No. 201080008789.5, 8 pages.
Chinese Office Action dated Jan. 6, 2013 in Appln No. 201080021957.4, 9 pages.
Canadian Office Action dated Jan. 18, 2013 in Appln No. 2,512,155, 6 pages.
U.S. Official Action dated Dec. 12, 2012 in U.S. Appl. No. 10/851,506, 76 pages.
U.S. Official Action dated Dec. 12, 2012 in U.S. Appl. No. 12/954,952, 86 pages.
U.S. Official Action dated Dec. 31, 2012 in U.S. Appl. No. 12/142,927, 49 pages.

* cited by examiner

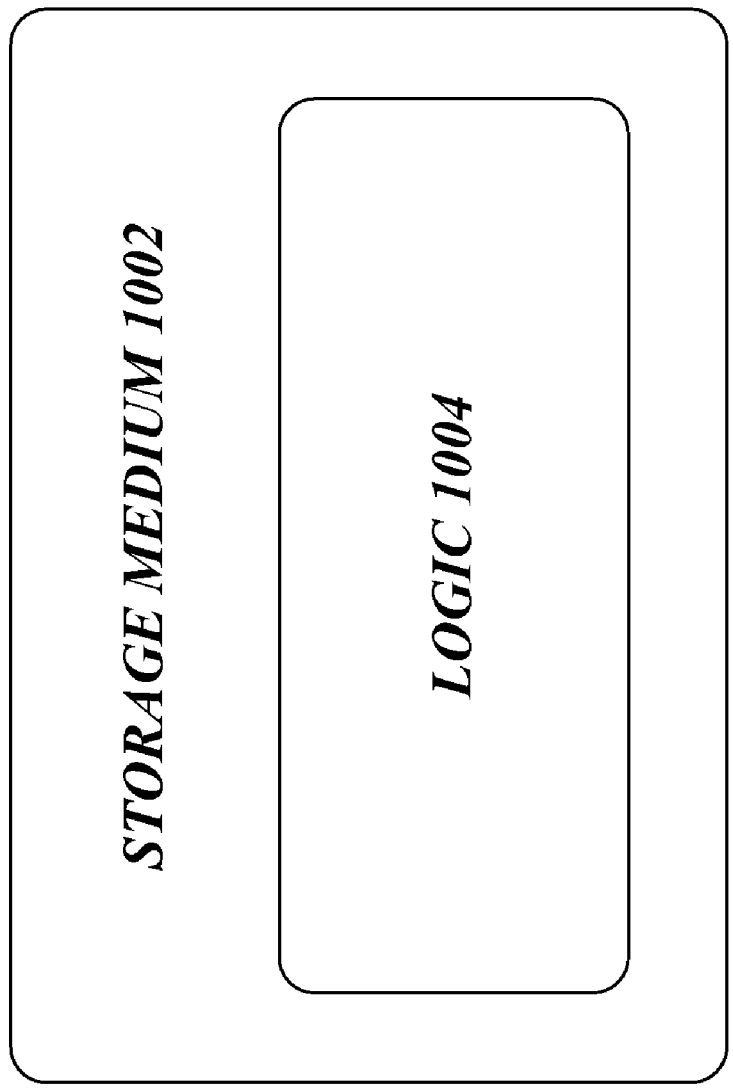

AUTOMATIC CONVERSATION TECHNIQUES

BACKGROUND

Electronic mail (E-mail) applications provide users with the ability to store messages in logical folders within the interface similar to that provided by many file systems. E-mail applications also may allow users to group stored messages into logical "conversations." Each conversation is a group of related messages including a root message and replies to the root message or to one another. When arranged by conversation, messages are displayed in a user interface of the e-mail application as a list of conversations grouped by message subject or thread. The conversations may be sorted by date, and the messages within each conversation may be sorted based on who replied to whom.

Despite the convenience offered by the conversation groups, some e-mail applications limit operations for a conversation to individual conversation items. For example, a user may not desire to engage in a conversation thread discussing lunch options with some colleagues. The user may need to delete the individual conversation items as they arrive to keep their inbox clear. Such operations may be tedious and time consuming for a user, particularly given the increasing volumes of e-mail messages a user might receive on any given day. Consequently, improvements to item management and display techniques are needed to solve these and other problems and to enhance the experience of users in various usage scenarios.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments are generally directed to automatic conversation techniques for a message application. Some embodiments are particularly directed to automatic conversation actions that may be applied across an entire conversation group or thread for a message application, such as an e-mail application, for example.

One embodiment, for example, may comprise an apparatus such as a computing device having a message application program. The message application program may comprise, among other elements, an incoming message module operative to receive an incoming message. The message application program may also comprise a conversation identification module communicatively coupled to the incoming message module, the conversation identification module operative to determine the incoming message is part of a conversation thread, and associate the incoming message with the conversation thread by setting a conversation identifier property of the incoming message to a conversation identifier for the conversation thread. The message application program may further comprise a conversation manager module communicatively coupled to the conversation identification module, the conversation manager module operative to determine a conversation rule is associated with the conversation thread, and apply the conversation rule to the incoming message. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 10 illustrates an embodiment of an article.

DETAILED DESCRIPTION

Figure 1:
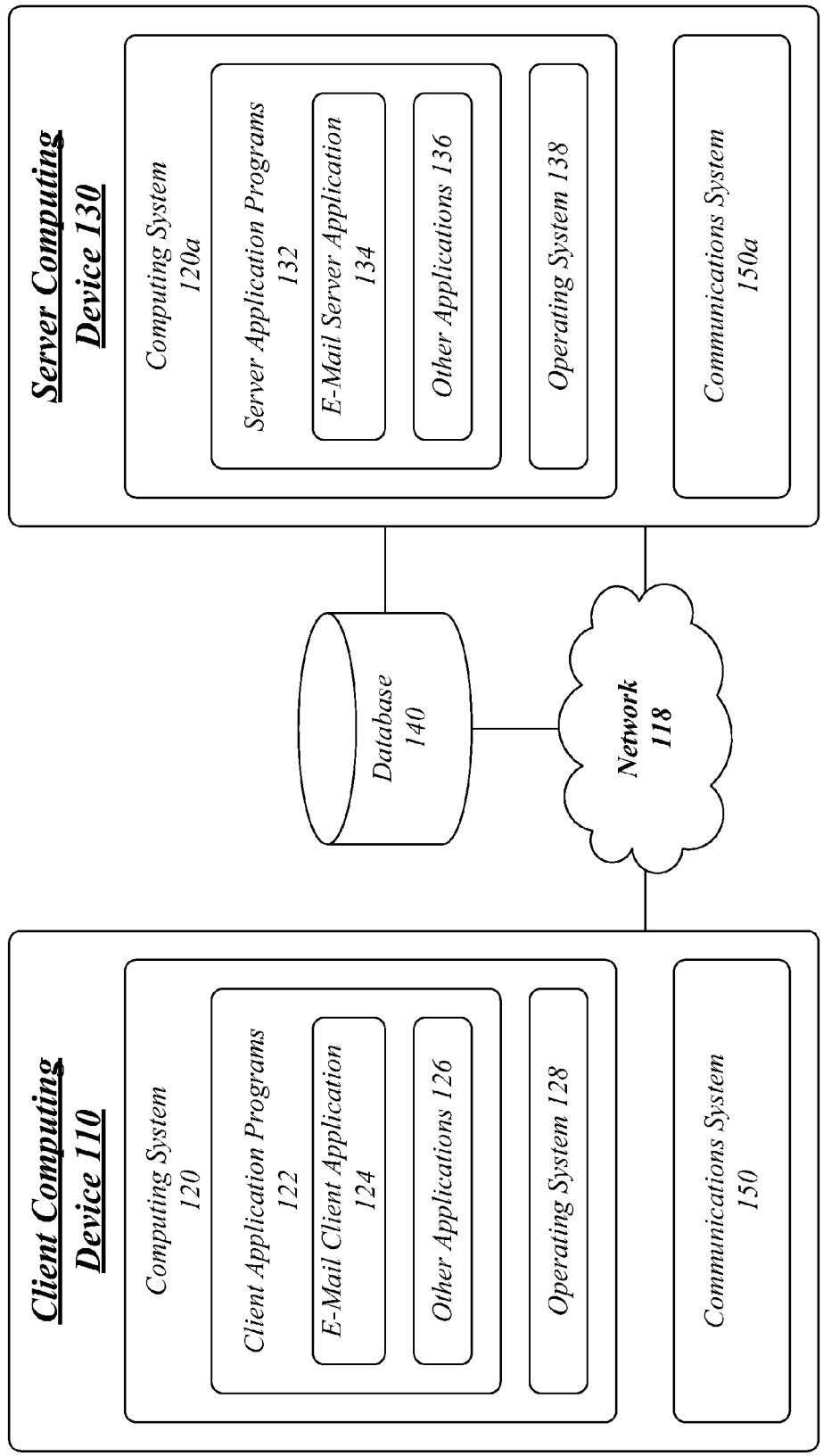
FIG. 1 illustrates an embodiment of an operating environment.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments may be directed to automatic conversation techniques for a message application. The automatic conversation techniques may be implemented for any message application. Examples of message applications may include without limitation an e-mail message application, text message application, short message service (SMS) message application, multimedia message server (MMS) message application, voice message application, video message application, and so forth. In one embodiment, the automatic conversation techniques may be described with reference to an e-mail application by way of example and not limitation. Specific implementations may implement the automatic conversation techniques with other messaging applications, however, and still fall within the scope of the embodiments.

Various embodiments may be directed to automatic conversation techniques for a message application such as an e-mail application. In general, an e-mail application allows users to compose, send, and receive messages over electronic communication systems. In some embodiments, the described techniques may be implemented by one or more elements of a client/server e-mail messaging system. In such embodiments, the server may support a variety of messaging clients, accept requests and data from clients, process the requests, store the data, and return the processing results to the clients. Accordingly, one or more of the item aggregation and display techniques may be implemented as features within client-based e-mail applications, server-based e-mail applications including a web-based e-mail applications providing access to e-mail services via a web browser, and/or by other types of applications, programs, or services that interact with e-mail.

In some embodiments, one or more of the automatic conversation techniques can be implemented within an e-mail client application or software program such as MICROSOFT OFFICE OUTLOOK® application software from Microsoft Corporation, Redmond, Wash. In such embodiments, the described techniques may be performed by the e-mail client application in either an online or offline mode. In an offline mode, the e-mail client application may perform one or more automatic conversation techniques on locally stored or cached e-mail messages. It can be appreciated that the described techniques may be implemented by any type of e-mail client in accordance with the described embodiments including, without limitation, Messaging Application Programming Interface (MAPI) clients, Hypertext Transfer Protocol (HTTP) clients, Post Office Protocol 3 (POP3) clients, Internet Message Access Protocol (IMAP or IMAP4) clients, Network News Transfer Protocol (NNTP) clients, and so forth.

Alternatively or additionally, one or more automatic conversation techniques may be implemented as features within a server-based e-mail application or software program such as MICROSOFT EXCHANGE SERVER® from Microsoft Corporation, Redmond, Wash. The server may provide e-mail, calendaring, contacts and tasks functionality and support for mobile and web-based access to information, as well as data storage. The server may comprise or communicate with a message store for storing items including e-mail messages and other data in mailboxes and folders and may provide an interface for communicating with various e-mail clients and allowing access to the message store. The server also may comprise or communicate with a directory containing information about the users of the system and configuration information which may be used by a message transfer subsystem to perform various routing and transfer operations for e-mail messages intended for recipients on the server, another server in the same organization, and/or for recipients on the Internet or other messaging systems.

In some embodiments, the server may support various Web services including web access, mobile access, and synchronization functionality, Internet Information Services (IIS) and Internet Server Application Programming Interface (ISAPI) applications providing SMTP, NNTP, IMAP4, and POP3 services to allow Internet users to access to messaging data over a variety of Internet access protocols and HTTP-based protocols including remote procedure call (RPC) over HTTP communication. In some implementations, data may be formatted as compressed Wireless Binary XML (WbXML) data to make efficient use of bandwidth for mobile clients. In addition to standard Internet protocols, the server also may support communication over proprietary or non-standard protocols when used by a company or other organization.

The e-mail application may provide users with the ability to store messages in logical folders within the interface similar to that provided by many file systems. It can be appreciated that the term folder may refer to any collection of items however stored and/or represented in a user interface. While some operating systems or applications may not use the term folder when referring to a collection of items, such scenarios are intended to be covered by embodiments that describe and illustrate folders.

The e-mail application also may allow users and/or logic to group stored messages into logical conversations to form a conversation group or conversation thread. Each conversation may comprise a group of related messages including, for example, a root message and replies to the root message or to one another. When a user selects to arrange messages by conversation, the messages are displayed in a user interface of the e-mail application as a list of conversations which may be grouped by message subject or thread. The conversations may be sorted by date, and the messages within each conversation may be sorted based on who replied to whom.

In some cases, the messages of a conversation may be stored across multiple folders. For example, users may manually organize messages into various folders. Users also may set one or more filtering rules for automatically separating e-mail messages into certain folders based on sender, subject, or other criteria. In addition, a reply message sent by a user may be stored within the sent items folder of the user.

Despite the convenience offered by the conversation threads, some e-mail applications limit operations for a conversation to individual conversation items. For example, a user may not desire to engage in a conversation thread discussing lunch options with some colleagues. The user may need to delete the individual conversation items as they arrive to keep their inbox clear. Such operations may be tedious and time consuming for a user, particularly given the increasing volumes of e-mail messages a user might receive on any given day.

To solve these and other problems, various embodiments may implement various automatic conversation techniques for a message application. Some embodiments are particularly directed to automatic conversation techniques that may be applied across an entire conversation group or conversation thread for a message application, such as an e-mail application, for example.

One embodiment, for example, may comprise an apparatus such as a computing device having a message application program, such as an e-mail application program. The message application program may comprise, among other elements, an incoming message module operative to receive an incoming message. The message application program may also comprise a conversation identification module communicatively coupled to the incoming message module, the conversation identification module operative to determine the incoming message is part of a conversation thread, and associate the incoming message with the conversation thread by setting a conversation identifier property of the incoming message to a conversation identifier for the conversation thread. The message application program may further comprise a conversation manager module communicatively coupled to the conversation identification module, the conversation manager module operative to determine a conversation rule is associated with the conversation thread, and apply the conversation rule to the incoming message. In this manner, a user needs to establish a conversation rule once, and the conversation rule is automatically applied to all the stored messages in a conversation thread, as well as new incoming messages that are part of the same conversation thread. As a result, a user may have an enhanced messaging experience.

More particularly, the conversation manager module implements automatic conversation techniques in the form of conversation level actions that may be applied across an entire conversation group or conversation thread. Conversation level actions typically affect some or all messages in the entire conversation thread. By way of contrast, item level actions typically affect a single message item. Examples of conversation rules may include without limitation an "always delete" conversation rule, an "always move" conversation rule, an "always categorize" conversation, among others. These are merely a few examples, and any number of conversation level actions may be implemented for a conversation thread as desired for a given implementation. The embodiments are not limited in this context.

FIG. 1 illustrates a block diagram for an operating environment 100 suitable for practicing the various embodiments. The operating environment 100 may comprise elements designed for implementation by a single entity environment or a multiple entity distributed environment. Each element may be implemented as a hardware element, software element, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof.

As used herein the terms "system," "subsystem," "component," and "module" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the operating environment 100 may comprise, among other elements, a client computing device 110 and a server computing device 130. The computing devices 110, 130 may be implemented utilizing any suitable electronic device having computing capabilities and communications capabilities. Examples for computing devices 110, 130 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the operating environment 100 as shown in FIG. 1 has a limited number of nodes in a certain topology, it may be appreciated that the operating environment 100 may include more or less nodes in alternate topologies as desired for a given implementation.

The computing devices 110, 130 may be communicatively coupled via a network 118 and appropriate wireless or wired communications media. The computing devices 110, 130 may coordinate operations between each other. The coordination may involve the uni-directional or bi-directional exchange of information. For instance, the computing devices 110, 130 may communicate information over the network 118. The network 118 may comprise a packet-switched network, a circuit-switched network, or a combination of both. The information can be implemented as data messages sent across various network interfaces. Exemplary network interfaces include parallel interfaces, serial interfaces, and bus interfaces.

The computing devices 110, 130 may implement respective computing systems 120, 120a. The computing systems 120, 120a may include various computing elements, such as one or more processors, co-processors, memory units, chipsets, controllers, peripherals, interfaces, oscillators, timing devices, video cards, audio cards, multimedia input/output (I/O) components, and so forth. The computing systems 120, 120a may implement, among other elements, respective client application programs 122 and server application programs 132. In the example illustrated in FIG. 1, the client application programs 122 may comprise an e-mail client application 124 and other applications 126, and the server application programs 132 may comprise an e-mail server application 134 and other applications 136. In various implementations, the e-mail client application 124 and/or e-mail server application 134 may perform one or more item aggregation and display techniques in accordance with the described embodiments.

The applications 126 may comprise one or more types of application programs supporting operation of the client computing device 110. Exemplary application programs may include, without limitation, a web browser application, telephone application (e.g., cellular, VoIP, PTT), networking application, messaging application (e.g., IM, SMS, MMS), calendar application, contacts application, tasks application, word processing application, spreadsheet application, database application, media application (e.g., video player, audio player, multimedia player, digital camera, video camera, media management), location based services (LBS) application, gaming application, and so forth.

The applications 136 may comprise one or more types of application programs supporting operation of the server computing device 130. In various implementations, the applications 136 may include server application programs supporting operation of the server computing device 130 as an e-mail server, a web server, and/or file server in accordance with the described embodiments. In some cases, one or more of the applications 136 may comprise a network, server or web-based version of one or more of the applications 126. In such cases, the applications 126, 136 may operate separately, such as when the client computing device 110 is offline, or may interoperate when the client computing device 110 is online and connected to the server computing device 130 via the network 118.

The computing systems 120, 120a also may comprise respective operating systems 128, 138 suitable for controlling the operation of the client computing device 110 and the server computing device 130. In some embodiments, the operating systems 128, 138 may comprise respective client and server versions of an operating system such as a MICROSOFT WINDOWS® operating system from Microsoft Corporation, Redmond, Wash. It can be appreciated that other suitable operating systems may be used for the client computing device 110 and/or the server computing device 130.

The computing devices 110, 130 may comprise or communicate with a data store for item storage such as e-mail messages and other data in mailboxes and folders. With reference to FIG. 1, the data store may be implemented by a database 140. In such implementations, the server computing device 130 may provide the client computing device 110 with access to the database 140 when connected via the network 118. Alternatively or additionally, the client computing device 110 may directly access the database 140 via the network 118. While shown as being separate elements for purposes of illustration, it can be appreciated that in some embodiments, the database 140 may form part of the client computing device 110 and/or the server computing device 130. It also can be appreciated that the data store can reside on the client computing device 110, the server computing device 130, and/or the database 140 and that, in some embodiments, the client computing device 110, the server computing device 130, and/or the database 140 may store respective data stores which may be synchronized with each other.

In addition to respective computing systems 120, 120a, the computing devices 110, 130 may implement respective communications system 150, 150a. The communications systems 150, 150a may include various communications elements, such as a transmitter, receiver, transceiver, radio, network interface, baseband processor, antenna, amplifiers, filters, and so forth. In one embodiment, for example, the computing devices 110, 130 may be implemented using a computing and communications architecture as described with reference to FIG. 2.

Figure 2:
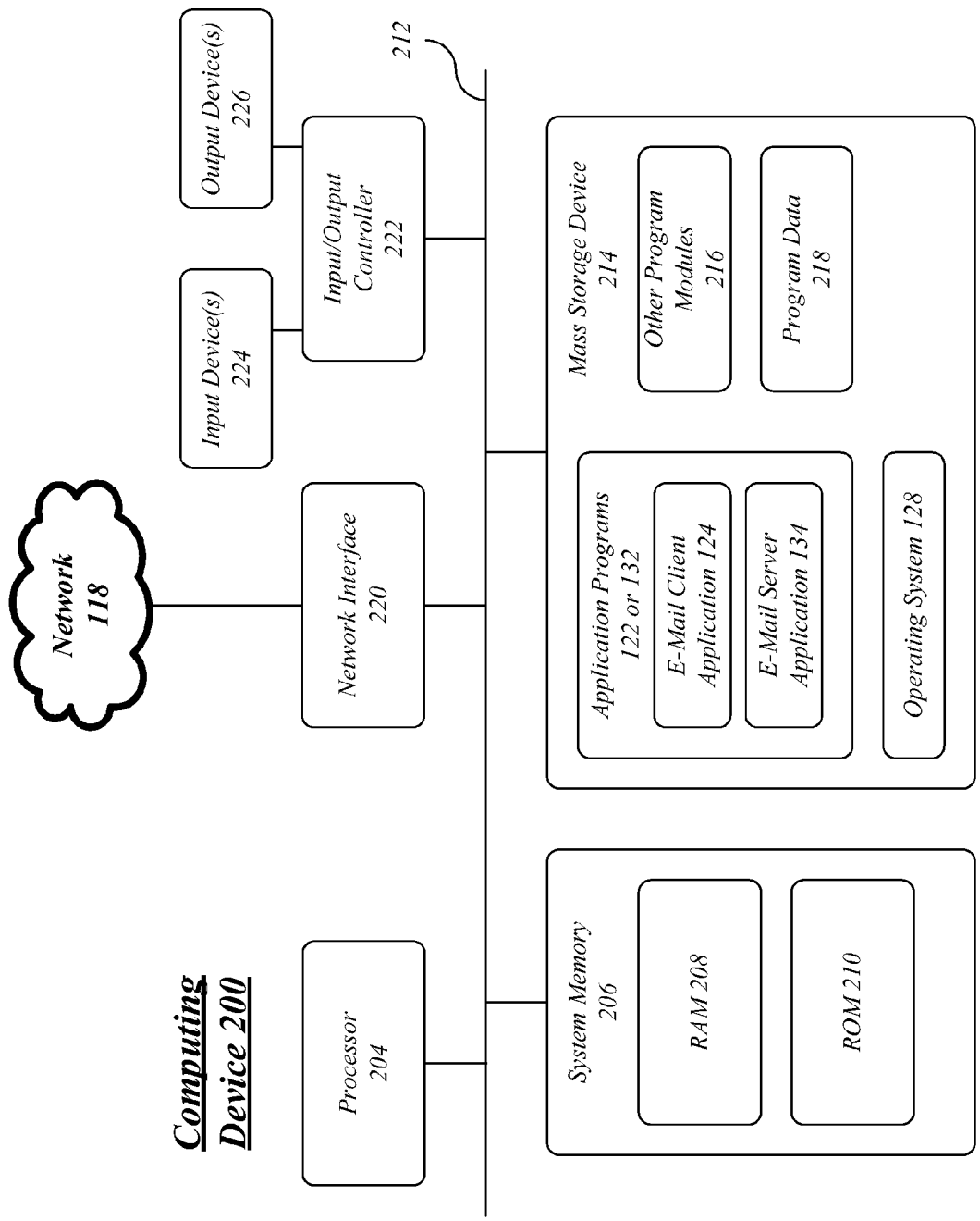
FIG. 2 illustrates an embodiment of a computing device.

FIG. 2 provides an illustrative architecture for a computing device 200 suitable for practicing the various embodiments. The computing device 200 may be representative of, for example, the client computing device 110 and/or the server computing device 130. As shown, the computing device 200 illustrates a conventional computing architecture for a personal or server computer, including a processing system comprising a processor 204 and a system memory 206. The system memory 206 may include, among other types of memory, a random access memory (RAM) 208 and a read-only memory (ROM) 210. An input/output (I/O) system, such as a basic I/O system (BIOS), may implement routines to assist in transferring information between elements within the computing device 200, such as during startup operations, using logic stored in the ROM 210. A system bus 212 communicatively couples all of the elements of the computing device 200 to facilitate information transfer and data processing operations.

The computing device 200 further includes a mass storage device 214 for storing an operating system, such as the operating system 128, as well as other program modules 216 and program data 218. The mass storage device 214 also may store various application programs, as described in greater detail below.

The mass storage device 214 is connected to the processor 204 through a mass storage controller (not shown) connected to the system bus 212. The mass storage device 214, and its associated computer-readable media, provides non-volatile storage for the computing device 200. Although the description of computer-readable media contained herein refers to a mass storage device, such as a hard disk or CD-ROM drive, it should be appreciated by those skilled in the art that computer-readable media can be any available media that can be accessed by the computing device 200. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments, the computing device 200 may operate in a networked environment using logical connections to remote computers through a network 118 which, in some implementations, may be a Transmission Control Protocol (TCP) and Internet Protocol (IP) network, such as the Internet. The computing device 200 may connect to the network 118 through a network interface 220 (e.g., a wired or wireless network interface) connected to the system bus 212. It can be appreciated that the network 118 may comprise any type of network in accordance with the described embodiments including, without limitation, a wide area network (WAN), a local area network (LAN), and/or a cellular telephone network and that the network interface 220 may support various transport layers such as GPRS, CDMA 1xRTT, IEEE 802.11, and others for connecting to a variety of networks and/or remote computer systems.

The computing device 200 may include an I/O controller 222 for receiving and processing input from a number of input devices 224. A user may enter commands and information into the computing device 200 through various input devices 224 such as a keyboard and pointing device, such as a mouse, trackball or touch pad. Other examples of input devices 224 may include a microphone, joystick, game pad, satellite dish, scanner, or the like. The input devices 224 may be connected to the processor 204 through the I/O controller 222 that is coupled to the system bus 212, but may be connected by other interfaces and bus structures, such as a parallel port, game port or a universal serial bus (USB). The I/O controller 222 also may provide output to various output devices 224, such as a monitor or other type of display device that is connected via the I/O controller 222 to the system bus 212. In various implementations, the display device may present one or more user interfaces (UIs) to a user in accordance with the described embodiments. In addition to a display device, the I/O controller 222 may provide output to a printer, speakers, and other peripheral devices.

As mentioned above, a number of program modules and data files may be stored in the mass storage device 214 and RAM 208 of the computing device 200. In the example illustrated in FIG. 2, the mass storage device 214 and RAM 208 may store the operating system 128 as well as one or more client application programs 122 including the e-mail client application 124 and other applications 126. It can be appreciated that in some implementations, the mass storage device 214 and RAM 208 may store the operating system 138 as well as one or more server application programs 132 including the e-mail server application 134 and other applications 136.

According to various embodiments, the e-mail client application 124 and/or the e-mail server application 134 may implement one or more automatic conversation techniques. In one embodiment, for example, the e-mail client application 124 and/or the e-mail server application 134 may be implemented as described with reference to FIG. 3.

Figure 3:
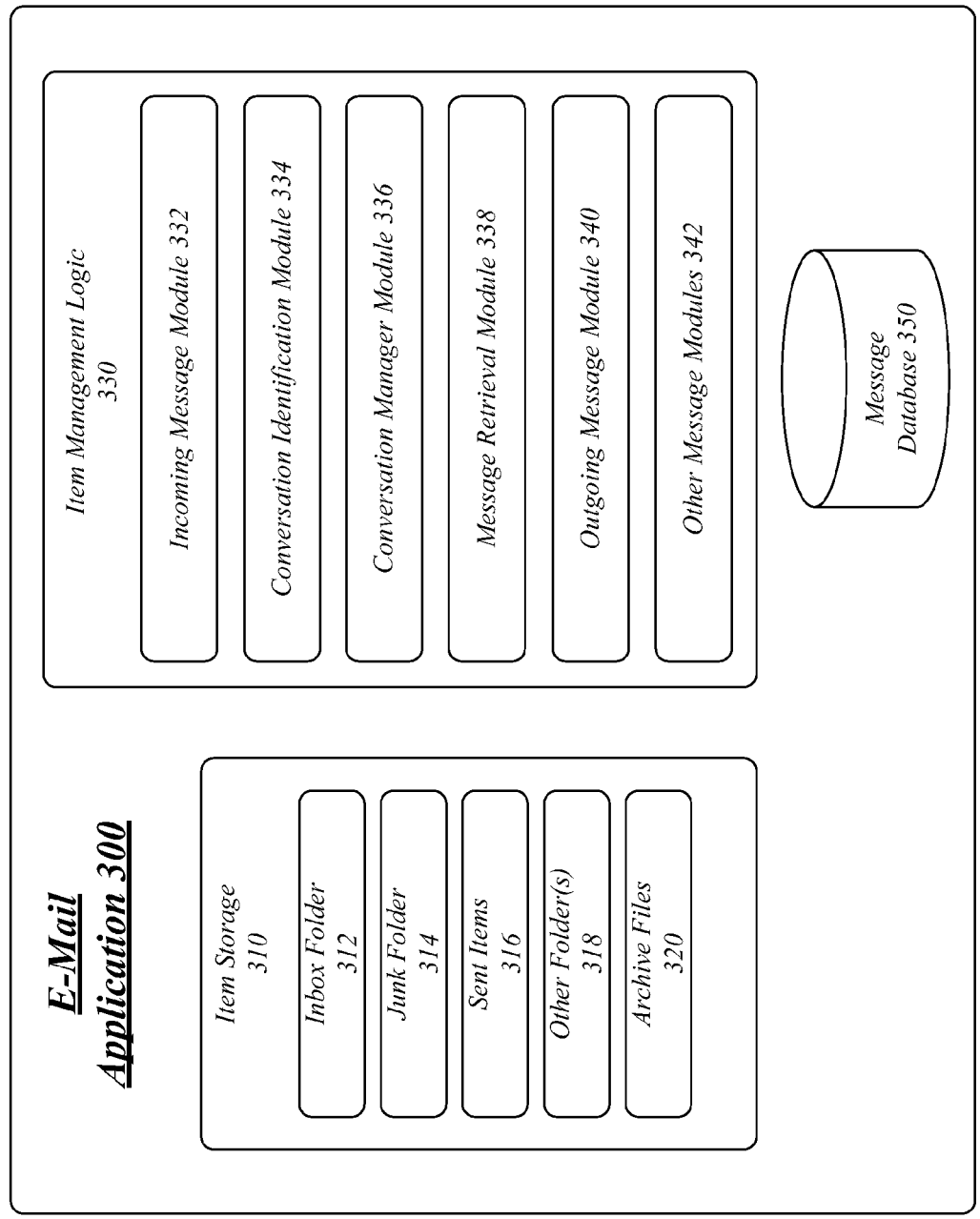
FIG. 3 illustrates an embodiment of an e-mail application.

FIG. 3 illustrates one embodiment of an e-mail application 300 suitable for practicing the various embodiments. With reference to FIGS. 1 and 2, in some implementations, the e-mail application 300 may operate as the e-mail client application 124 as one of the client application programs 122 that reside on the computing device 110. Alternatively or additionally, the e-mail application 300 may operate as the e-mail server application 134 as one of the server application programs 132 that reside on the computing device 130. Further, one or more parts of the e-mail application 300 may be distributed between the e-mail client application 124 and the e-mail server application 134. One or more parts of the e-mail application 300 also may be implemented by application programs in the RAM 208 of the computing device 200, on another remote computer, or in any other variation as would occur to one in the computer software art.

As shown, the e-mail application 300 may include item storage 310. While the item storage 310 is shown as part of the e-mail application 300 for purposes of illustration, and not limitation, it can be appreciated that the item storage 310 can reside in various locations in accordance with the described embodiments. For instance, the item storage 310 may reside on the client computing device 110, the server computing device 130, and/or the database 140. As one non-limiting example, the item storage 310 of the e-mail application 300 can reside within the program data 218 of the computing device 200, either in a database and/or in one or more files. As another non-limiting example, the item storage 310 can reside all or in part in a directory specified by the user in the file system of an operating system such as operating system 128 or operating system 138. As another non-limiting example, the item storage 310 can reside all or in part on the database 140 which may be accessed or hosted by the server computing device 130.

In the example illustrated in FIG. 3, the item storage 310 includes an inbox folder 312, a junk folder 314, a sent items folder 316, one or more other e-mail folders 318, and one or more archive files 320. It can be appreciated that the term folder or file may refer to any collection of items however stored and/or represented in a user interface. While some operating systems or applications may not use the term folder when referring to a collection of items, such scenarios are intended to be covered by embodiments that described and illustrate folders. It also can be appreciated that other folder variations and files may be implemented in accordance with the described embodiments.

The e-mail application 300 may provide the user with the ability to store items in certain logical folders such as the inbox folder 312, the junk folder 314, the sent items folder 316, and one or more other e-mail folders 318 such as a user-created folder for storing items associated with a certain sender or recipient, subject (e.g., project), content (e.g., text, attachment), or other criteria. The user may interface with the e-mail application 300 and manually organize items into various folders. The user also may set one or more filtering rules for automatically separating items into certain folders based on sender, recipient, subject, content, or other criteria. In addition, replies message sent by the user in response to other messages may be stored within the sent items folder 316. The users also may store older items in one or more archive files 320 which may be implemented as one or more Personal Storage Table extension (.pst) files on the local hard drive of the user and/or any other suitable archiving data structure.

The e-mail application 300 may allow the user to group stored messages into logical conversations. Each conversation may comprise a group of related items including, for example, a root message and replies to the root message or to one another. In some cases, the related items of a conversation may be stored across multiple storage locations such as across two or more of the inbox folder 312, junk folder 314, sent items folder 316, other e-mail folders 318, and archive files 320.

As shown, the e-mail application 300 may include item management logic 330 which may be responsible for carrying out some or all of the item aggregation and display techniques described herein. In the example illustrated in FIG. 3, the item management logic 330 includes various modules, with each module representing discrete sets of logic for various operations performed by the item management logic 330.

The item management logic 330 also may comprise other logic for operating the e-mail application 300 which may support various other operations and capabilities. Exemplary operations and capabilities may include sending and receiving operations, storing and organizing operations, filtering operations, sorting operations, searching operations, previewing operations, capabilities for synchronization, capabilities for accessing messaging data including web access and mobile access, capabilities for detecting the online/offline state of users, capabilities for integrating the e-mail application 300 with calendar, contacts and tasks functionality, and/or any other features in accordance with the described embodiments.

In some implementations, the item management logic 330 may reside within the e-mail application 300 as part of the client application programs 122 on the client computing device 110 or as part of the server application programs 132 on the server computing device 130. It can be appreciated, however, that the item management logic 330 can alternatively or additionally be embodied as computer-executable instructions stored on one or more types of computer-readable storage media in a variety of locations in accordance with the described embodiments.

Although the example illustrated in FIG. 3 includes a particular set of logic, it can be appreciated that the item management logic 330 provides an exemplary implementation of the general functionality. It is to be understood that the sequence of logic does not necessarily have to be executed in the order presented unless otherwise indicated. In addition, while the item management logic 330 may be described as performing a certain sequence of steps, other sequences of steps may also be performed according to alternative embodiments. Moreover, some individual steps performed by the item management logic 330 may include multiple sub-steps that may be performed in various sequences as appropriate to the individual step. Furthermore, additional steps may be performed or some steps may be omitted by the item management logic 330 depending on the particular implementation.

In the illustrated embodiment shown in FIG. 3, the item management logic 330 may be subdivided into an incoming message module 332, a conversation identification module 334, a conversation manager module 336, a message retrieval module 338, and an outgoing message module 340. It should be appreciated that these modules may share one or more common instructions. Furthermore, it should be appreciated that the item management logic 330 may include other message modules 342 in addition to the illustrated modules to provide additional message functionality. For instance, the item management logic may include a message module that filters out "spam" e-mail messages.

When executed by processor 204, incoming message module 332 interacts with operating system 128 to receive incoming e-mail messages that are received from network 118 by network interface 220. For instance, incoming message module 332 may use an interface provided by operating system 128 to configure a callback that causes operating system 128 to provide incoming e-mail messages to incoming message module 332. When incoming message module 332 receives an incoming e-mail message, incoming message module 332 may perform one or more e-mail processing operations on the incoming e-mail message. For instance, incoming message module 332 may determine whether the incoming e-mail address includes a "to" property, a "cc" property, or a "bcc" property that specifies an e-mail address associated with an active account maintained by the computing devices 110, 130. In this example, incoming message module 332 may generate an outgoing "bounce" message when the "to" property, the "cc" property, or the "bcc" property of the incoming e-mail message specifies an e-mail address associated with an inactive account that was previously maintained by the computing devices 110, 130. After incoming message module 332 performs the e-mail processing operations on the incoming e-mail message, incoming message module 332 may provide the incoming e-mail message to conversation identification module 334.

The item management logic 330 may include the conversation identification module 334 communicatively coupled to the incoming message module 332. The conversation identification module 334 is operative to determine the incoming message is part of a conversation thread. The conversation identification module 334 associates the incoming message with the conversation thread by setting a conversation identifier property of the incoming message to a conversation identifier for the conversation thread.

When executed by processor 204, conversation identification module 334 receives incoming e-mail messages from incoming message module 332 and attempts to identify an existing conversation associated with the incoming e-mail message. If conversation identification module 334 cannot successfully identify an existing conversation associated with the incoming e-mail message, conversation identification module 334 may associate the incoming e-mail message with a new conversation.

The conversation identification module 334 may determine whether a message is part of an existing conversation in a number of different ways. In one embodiment, for example, the conversation identification module 334 executes an algorithm that associates the incoming e-mail message with an existing conversation when one or more of the following conditions occur:

(1) The incoming e-mail message includes an "in-reply-to" property that specifies a value that corresponds to a value specified by a "message identifier" property of a stored message associated with the existing conversation;
(2) The incoming e-mail message includes a "references" property that specifies a value that corresponds to a value specified by a "message identifier" property of a stored message associated with the existing conversation; and
(3) A normalized "subject" property of the incoming e-mail corresponds to a normalized "subject" property of a stored message associated with the existing conversation.

The occurrence of one of these conditions may represent an exemplary set of preconditions for allowing the conversation identification module 334 to associate the incoming e-mail message with an existing conversation. There may be implementations, however, in which additional conditions could occur before the conversation identification module 334 associates the incoming e-mail message with an existing conversation. For instance, one implementation may associate a received message with an existing conversation when condition (2) occurs only if condition (1) does not occur.

Additionally or alternatively, the conversation identification module 334 does not act to associate e-mail messages with conversations. Rather, the conversation identification module 334 may perform actions to associate e-mail messages with conversations. This includes both incoming e-mail messages and outgoing e-mail messages.

After conversation identification module 334 associates the incoming e-mail message with an existing conversation or associates the incoming e-mail message with a new conversation, conversation identification module 334 may store in a message database 350 the incoming e-mail message along with a conversation identifier that identifies the conversation associated with the incoming e-mail message. In one implementation, message database 350 includes a table that includes a row for each e-mail message and a column for each property of an e-mail message. For instance, the table may include a column for a "to" property of an e-mail message, a "from" property of the e-mail message, a "cc" property of the e-mail message, a "date" property of the e-mail message, a "subject" property of the e-mail message, a "body" property of the e-mail message, and so on. Furthermore, in this instance, the table may include a column for a conversation identifier that identifies the conversation associated with the e-mail message. An example is provided in Table 1 as follows:

TABLE 1

| To | From | Subject | Body | Conversation Identifier | ... |
|---|---|---|---|---|---|
| jones@Microsoft.com | smith@microsoft.com | Atlanta Office Closed | The Atlanta Office is closing today... | 53713 | |
| ybara@Microsoft.com | barney@microsoft.com | Lunch today? | Want to get lunch at noon... | 25415 | |
| barney@Microsoft.com | ybara@microsoft.com | RE: Lunch today? | Sure, where do you want to go? | 25415 | |
| ybara@Microsoft.com | barney@microsoft.com | RE: RE: Lunch today? | Let's go to Mario's... | 25415 | |
| ... | ... | ... | ... | ... | |

It should be appreciated that the table may include columns for many other properties of e-mail messages. These other properties may include an "X-MimeOLE" property, a "Content-class" property, a "MIME-Version" property, a "Content-Type" property, a "Content-Transfer-Encoding" property, a "Date" property, a "Message-ID" property, an "X-MS-Has-Attach" property, a "X-MS-TNEF-Correlator" property, an "X-Priority" property, a "Priority" property, an "Importance" property, a "cc" property, a "bcc" property, and so on. Furthermore, it can easily been seen that Table 1 includes a series of e-mail messages exchanged between a person associated with the e-mail address "ybara@microsoft.com" and a person associated with the e-mail address "barney@microsoft.com" regarding whether to get lunch. It should be noted that these e-mail messages have the same conversation identifier listed in their "conversation identifier" properties. In this way, the conversation identifiers of the "conversation identifier" properties of these e-mail messages indicate that these e-mail messages are associated with a common conversation.

The item management logic 330 may include the message retrieval module 338 communicatively coupled to the conversation manager module 336. When executed by processor 204, message retrieval module 338 enables users to retrieve e-mail messages stored in message database 350. When the e-mail application 300 is implemented by the server computing device 130, for example, message retrieval module 338 may receive periodic requests from the e-mail client application 124 on the client computing device 110 to retrieve new messages that specify an e-mail address associated with a user of the client computing device 110. In response to such requests, message retrieval module 338 may identify any new e-mail messages in message database 350 that have not previously been sent to the client computing device 110. If message retrieval module 338 identifies any such new e-mail messages, message retrieval module 338 may send the identified e-mail messages, along with the conversation identifiers of the e-mail messages, to the client computing device 110. Upon receiving the identified e-mail messages, the e-mail client application on client computing device 110 may present a user interface view in which the identified e-mail messages, along with previously retrieved e-mail messages, are grouped by conversation with which the e-mail messages are associated. For instance, client computing device 110 may present a user interface view in which e-mail messages that are associated with a conversation are presented as trees of e-mail messages. In another instance, client computing device 110 may present an interface that includes separate lists of e-mail messages for each conversation.

The item management logic 330 may include the outgoing message module 340 communicatively coupled to the message retrieval module 338. When executed by processor 204, outgoing message module 340 enables users to send outgoing e-mail messages. For example, outgoing message module 340 may receive a request from the e-mail client application 124 on the client computing device 110 to send an outgoing e-mail message. In this example, outgoing message module 340 may associate the outgoing e-mail message with a conversation identifier and incorporate this conversation identifier into the outgoing e-mail message. After outgoing message module 340 associates the outgoing e-mail message with the conversation identifier and incorporates this conversation identifier into the outgoing e-mail message as a "conversation identifier" property of the e-mail message, outgoing message module 340 may instruct operating system 128 to send the outgoing e-mail message on network 118.

The item management logic 330 may include the conversation manager module 336 communicatively coupled to the conversation identification module 334. The conversation manager module 336 may be generally arranged to implement various automatic conversation techniques. The conversation manager module 336 implements automatic conversation techniques in the form of conversation level actions that may be applied across an entire conversation group or conversation thread managed by the e-mail application 300. Conversation level actions typically affect some or all messages in the entire conversation thread. By way of contrast, item level actions typically affect a single message item.

One of the main tenets of helping users reduce information overload with the conversation functionality is giving them an easy way to act on a conversation model. The conversation model now intelligently represents the group of messages with which the user is interacting. There are two main groups of actions that the new conversation model will support. First, the conversation model promotes what were previously item-level only actions to the conversation level, and the introduction of a new set of actions specifically for conversation items. The promotion of item-level actions is about batching together actions that used to be performed individually on messages, such as "Flag," "Categorize," "Assign," and so forth, so that the user needs to set a single conversation rule for an entire conversation. For example, the user can flag a conversation thread and use that to easily flag the latest message in the conversation thread. Furthermore, having conversation-level views allows the e-mail application 300 to introduce the second category of actions, particularly those that act specifically on the conversation thread itself. These are a set of operations that leverage the semantic of a "conversation," such as always delete or always move conversation rules.

The conversation manager module 336 is operative to create a conversation rule for a conversation thread. An operator or user may create a conversation rule for a conversation thread by selecting one or more messages from a conversation thread, and assigning a conversation rule to the one or more messages. The conversation rule defines a set of conversation level actions to perform on existing and future messages having a common conversation identifier (ID) property for a conversation thread. The existing messages may be stored in the message database 350. The future messages may include new incoming messages to the e-mail application 300 received from a remote device across the network 118 and the network interface 220. Some examples of conversation rules include without limitation an "always delete" conversation rule, an "always move" conversation rule, an "always categorize" conversation, among others. Each of these conversation rules are described further below.

Once the conversation manager module 336 creates a conversation rule for a conversation thread, the conversation manager module 336 stores the conversation rule in a conversation action table (CAT). The CAT is a new table designed to store the information needed to drive conversation level actions. The CAT is where a conversation "object" has an ongoing action associated with it. It is a table in the PST that contains an entry for each conversation which has an ongoing action or set of actions. The basic structure of the CAT is shown in Table 2 as follows:

TABLE 2

| Example of... | CONVERSATION IDENTIFIER | Always Delete Yes/No | Always Move Yes/No | Always Move Destination | Categorize Yes/No | Categorize Categories | Expiration |
|---|---|---|---|---|---|---|---|
| Always Delete | 1 | Yes | Yes | Deleted Items | | | 11:08:55 6/8/07 |
| Always Move | 2 | | Yes | Contoso | | | 13:40:51 6/9/07 |
| Always Categorize | 3 | | | | Yes | Personal, Family | 07:01:11 6/10/07 |

As shown in Table 2, the CAT may contain a conversation identifier, a parameter (Yes or No) to indicate whether a conversation rule is applied to the conversation identifier, and information needed to implement a given rule, such as a target folder for the always move conversation rule, or a category name for the always category conversation rule. The CAT also provides an expiration date and time to indicate when a given conversation rule is to remain in force. Whenever a new incoming message arrives at the incoming message module 332, and the conversation identification module 334 identifies the incoming message as part of a conversation thread, the conversation manager module 336 consults the CAT the performs subsequent message handling operations on the incoming message in accordance with the various conversation rules associated with the conversation thread.

The conversation manager module 336 is operative to create an always delete conversation rule to automatically route the incoming message to a deleted items folder. The always delete conversation rule is a power-user feature that allows a user to automatically move new items that arrive in a conversation to a Deleted Items folder thereby eliminating the incoming message from an Inbox folder. A user may create an always delete conversation rule by selecting a user interface element, such as a user interface button on a user interface ribbon.

When a user selects a single conversation item, such as a message for a conversation, to bring the single conversation item in focus, and selects the user interface button for "Always Delete," the conversation manager module 336 initiates operations to create the always delete conversation rule. The conversation manager module 336 first determines if the conversation already has a pre-existing always delete conversation rule in place. This may be accomplished by checking a property on the conversation item to determine if a parent conversation item has the ongoing action associated with it. This property is set for the message when the CAT processing occurs. The conversation manager module 336 generates a user interface view such as a dialog box having the following properties as shown in Table 3:

TABLE 3

| Proposed Dialog String | Option Buttons |
|---|---|
| This will move the current items in this conversation and all new items that arrive to the Deleted Items folder. Click OK to ignore this conversation. | OK CANCEL |
| Don't show me this dialog again. | CHECK UNCHECK |

When the user clicks [OK], all of the individual messages in the current folder for the conversation are moved to the Deleted Items folder. An entry is created in the CAT for this conversation using its PR_CONVERSATION_ID if one does not exist already. New conversation items that arrive to this conversation and match the PR_CONVERSATION_ID will automatically be moved to the Deleted Items folder. This logic is subject to the expiration guidelines set in the CAT.

When multiple conversation items have focus, and a user selects the user interface button for "Always Delete," the conversation manager module 336 initiates operations to create the always delete conversation rule. The conversation manager module 336 first determines whether the current folder for the selected conversation items is the Deleted Items folder. If not, the conversation manager module 336 generates a user interface view such as a dialog box having the following properties as shown in Table 4:

TABLE 4

| Proposed Dialog String | Option Buttons |
|---|---|
| This will move the current items in the selected conversations and allow new items that arrive to them to the Deleted Items folder. Click OK to ignore these conversations. | OK CANCEL |
| Don't show me this dialog again. | CHECK UNCHECK |

When the user clicks [OK], all of the individual messages in the current folder for the selected conversations are moved to the Deleted Items folder. An entry is created in the CAT for each of the conversations using the PR_CONVLRSATION_ID. New items that arrive to these conversations and match the PR_CONVLRSATION_ID will automatically be moved to the Deleted Items folder. This logic is subject to the expiration guidelines set in the CAT.

A user can disable the "Always Delete" ongoing action on a conversation in a number of different ways. To disable an always delete conversation rule for a conversation, the user may go to the Deleted Items folder.

When a single conversation item has focus and is currently subject to the always delete conversation rule, and the current folder is the Deleted Items folder, then a ribbon user interface will display a "Disable Always Delete" user interface button to remove the always delete conversation rule from the conversation thread. Selecting the user interface button causes the conversation manager module 336 to generate a user interface view such as a dialog box having the following properties as shown in Table 5:

TABLE 5

| Proposed Dialog String | Option Buttons |
|---|---|
| This will stop deleting new items that arrive in this conversation. Click OK to stop ignoring this conversation and move the selected conversation to the Inbox folder. | OK CANCEL |
| Don't show me this dialog again. | CHECK UNCHECK |

When a user selects [OK], all of the individual messages in the conversation thread are moved to the Inbox folder. The conversation manager module 336 removes the corresponding entry for the always delete conversation rule from the CAT.

When multiple conversation items are in focus and are currently subject to the always delete conversation rule, and the current folder is the Deleted Items folder, then a ribbon user interface will display a "Disable Always Delete" user interface button to remove the always delete conversation rule from the conversation thread. Selecting the user interface button causes the conversation manager module 336 to generate a user interface view such as a dialog box having the following properties as shown in Table 6:

TABLE 6

| Proposed Dialog String | Option Buttons |
|---|---|
| This will stop deleting new items that arrive in these conversations. Click OK to stop ignoring these conversations and move the selected conversations to the Inbox folder. | OK CANCEL |
| Don't show me this dialog again. | CHECK UNCHECK |

When the user selects [OK], all of the individual messages in the selected conversations are moved to the Inbox folder. The conversation manager module 336 removes the corresponding entries for the always delete conversation rules from the CAT.

It is worthy to note that the conversation manager module 336 does not check the enabled/disabled state of every conversation when in a multi-select state since this could affect performance of the e-mail application 300, such as causing a slow-down in view rendering. To improve performance, the conversation manager module 336 does not check each conversation, but rather will default to assuming all of them have the ongoing action associated with it. Alternatively, the conversation manager module 336 could check the enabled/disabled state of every conversation when in a multi-select state for a given implementation when performance is not an issue.

The conversation manager module 336 is operative to create an always move conversation rule to automatically route the incoming message to a target items folder. The always move conversation rule is another power-user feature that enables the user to easily move items in a specific conversation to a folder of their choosing. It is much lighter-weight than creating a regular rule and is accessed off of the "Move To Folder" ribbon button.

When a single conversation item has focus, and a target folder is chosen, a ribbon user interface will display a "Always Move" user interface button to initiate operations for generating an always move conversation rule to move messages to the target folder. Selecting the user interface button causes the conversation manager module 336 to generate a user interface view such as a dialog box having the following properties as shown in Table 7:

TABLE 7

| Proposed Dialog String | Option Buttons |
|---|---|
| This will move the current items in this conversation and all new items that arrive to the <chosen> folder. Click OK to always move this conversation. | OK CANCEL |
| Don't show me this dialog again. | CHECK UNCHECK |

When the user clicks [OK], all of the individual messages in the current folder for the conversation are moved to the chosen folder. The conversation manager module 336 creates a new entry in the CAT for this conversation using its PR_CONVERSATION_ID if one does not exist already. The conversation manager module 336 evaluates and automatically moves new conversation items with a matching PR_CONVERSATION_ID to the target folder. This logic is subject to the expiration guidelines set in the CAT.

When multiple conversation items have focus, and a target folder is chosen, a ribbon user interface will display a "Always Move" user interface button to initiate operations for generating an always move conversation rule to move messages for multiple conversations to the target folder. Selecting the user interface button causes the conversation manager module 336 to generate a user interface view such as a dialog box having the following properties as shown in Table 8:

TABLE 8

| Proposed Dialog String | Option Buttons |
|---|---|
| This will move the current items in these conversations and all new items that arrive to the <chosen> folder. Click OK to always move this conversation. | OK CANCEL |
| Don't show me this dialog again. | CHECK UNCHECK |

When the user clicks [OK], all of the individual messages in the current folder for the selected conversations are moved to the chosen folder. The conversation manager module 336 creates an entry in the CAT for these conversations using their PR_CONVERSATION_ID if one does not exist already. If the PR_CONVERSATION_ID already has an always move conversation rule associated with it, this overwrites that rule. It will also reset the expiration time to a default time. New items that arrive to this conversation and match the PR_CONVERSATION_ID will automatically be moved to the selected folder. This logic is subject to the expiration guidelines set in the CAT.

There are a few exception cases for an always move conversation rule. For example, if a user chooses Deleted Items as the destination folder for the always move conversation rule, it is essentially the same as an always delete conversation rule. When the conversation is selected in the Deleted Items folder, the "Always Delete" button will toggle to its "deactivate" state.

A user can disable an always move conversation rule in a number of different ways. For example, when a single conversation item has focus, the conversation manager module 336 may determine whether the conversation item is currently subject to a pre-existing always move conversation rule. This may be accomplished by checking a property on the conversation item to determine if a parent conversation item has the ongoing action associated with it. This property is set for the message when the CAT processing occurs. A ribbon user interface will display a "Disable Always Move" user interface button to remove the always move conversation rule from the conversation thread. Selecting the user interface button causes the conversation manager module 336 to generate a user interface view such as a dialog box having the following properties as shown in Table 9:

TABLE 9

| Proposed Dialog String | Option Buttons |
|---|---|
| New items in this conversation are automatically being moved to the folder <chosen> folder. Click OK to stop always moving new items to the <chosen> folder. | OK CANCEL |
| Don't show me this dialog again. | CHECK UNCHECK |

When the user clicks [OK], the conversation manager module 336 stops the ongoing always move action. The conversation manager module 336 removes the entry for the conversation thread from the CAT. The conversation items may optionally be moved or not moved from their current location based on a given implementation.

When multiple conversation items have focus, a ribbon user interface will display a "Disable Always Move" user interface button to remove the always move conversation rule from the conversation threads. Selecting the user interface button causes the conversation manager module 336 to generate a user interface view such as a dialog box having the following properties as shown in Table 10:

TABLE 10

| Proposed Dialog String | Option Buttons |
|---|---|
| New items in the selected conversations are automatically being moved to other folders. Click OK to stop always moving new items to these conversations. | OK CANCEL |
| Don't show me this dialog again. | CHECK UNCHECK |

When the user clicks [OK], the conversation manager module 336 stops the ongoing always move action for all conversations that have the action associated with them. The conversation manager module 336 removes the entries for the conversation threads from the CAT. The conversation items may optionally be moved or not moved from their current location based on a given implementation.

The conversation manager module 336 is operative to create an always categorize conversation rule to automatically assign a category for the incoming message. Assigning a category to a conversation item automatically enables ongoing categorization for the entire conversation thread.

When assigning a category using an appropriate "Always Categorize" user interface button from the ribbon user interface on a single conversation item, the selected categories are applied to all of the items in all folders for that conversation. This is an ongoing action, and a CAT entry is automatically created. This is additive to other categories that may exist for any individual messages. For example, assume a conversation thread has messages 1, 2, 3 and 4, where message 1 has a category A, message 3 has a category B, and all messages 1-4 are in an Inbox folder. If a user selects the conversation thread and applies the "Always Categorize" action with the category C, the results are additive as follows:

Message 1—Categories A+C
Message 2—Category C
Message 3—Categories B+C
Message 4—Category C These and other concepts for the always categorize conversation item may be described in more detail with reference to FIGS. 4-8.

Figure 4:
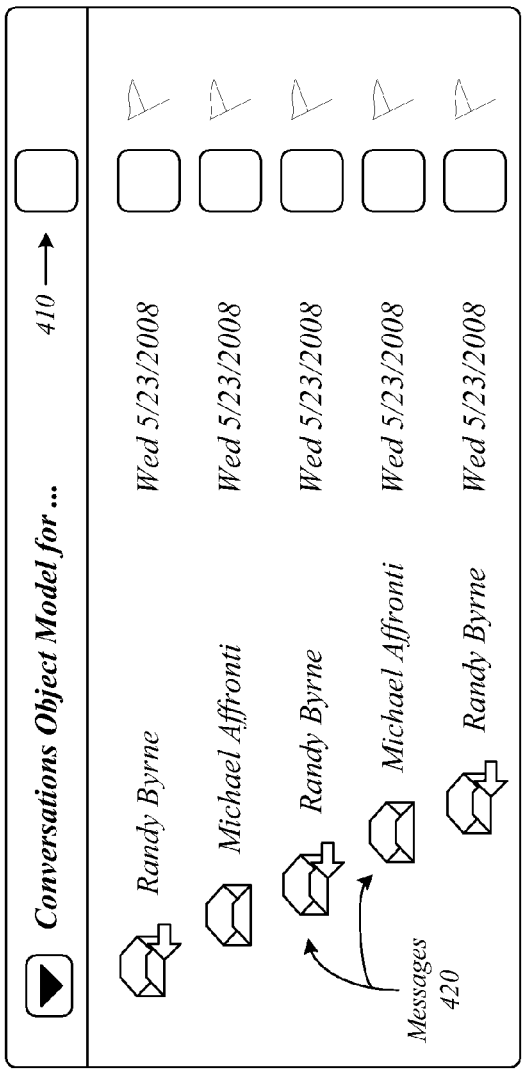
FIG. 4 illustrates an embodiment of a first conversation view.
Figure 4:
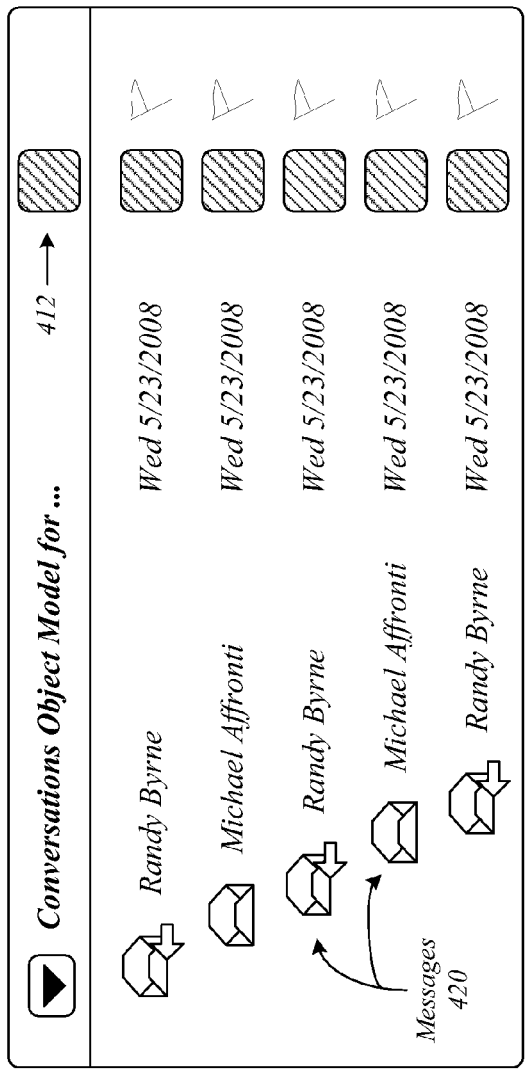

FIG. 4 illustrates an embodiment of conversation views 402, 404. The conversation views 402, 404 represent conversation views grouping messages by a conversation thread. The conversation views 402, 404 illustrate multiple messages 420 each having a category indicator. In the conversation view 402, each message 420 has a category indicator 410 that is empty thereby indicating that no category has been assigned to the corresponding message 420. When multiple conversation items are selected, and an always categorize conversation rule is applied to all of the messages in all folders that comprise those conversations, then all of the messages 420 are assigned to the chosen category or categories as indicated by the category indicators 412 that are shaded.

Figure 5:
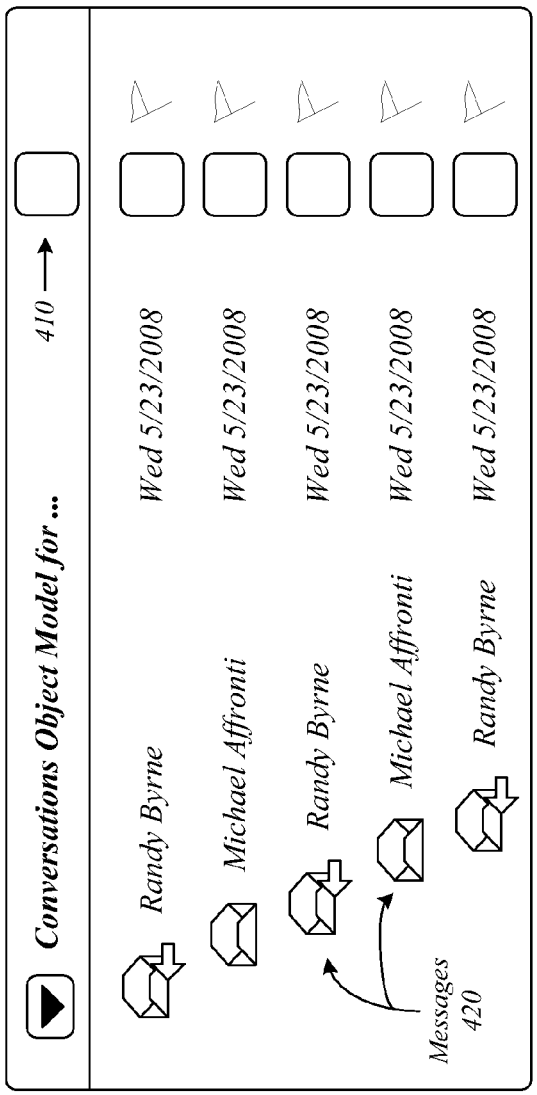
FIG. 5 illustrates an embodiment of a second conversation view.
Figure 5:
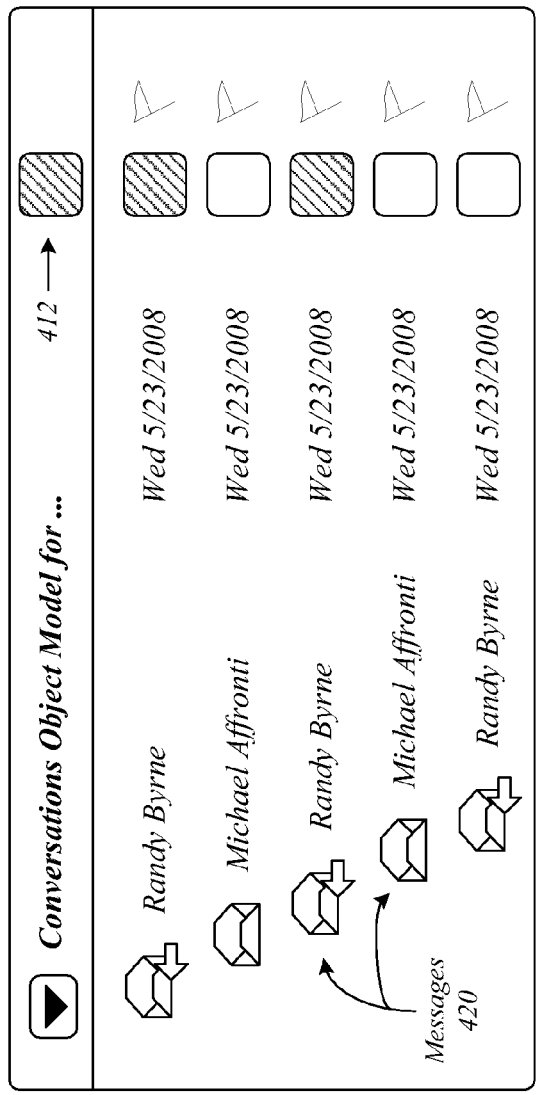

FIG. 5 illustrates an embodiment of conversation views 502, 504. The conversation views 502, 504 also represent conversation views grouping messages by a conversation thread. When the conversation manager module 336 is acting on messages 420 of a selected message type, such as all messages for "Randy Byrne" for example, the conversation manager module 336 applies the chosen categories to only the messages 420 of the selected message type. As shown in FIG. 5, the conversation view 504 has assigned the chosen category to the selected messages 420 as indicated by the category indicators 412 that are shaded.

Figure 6:
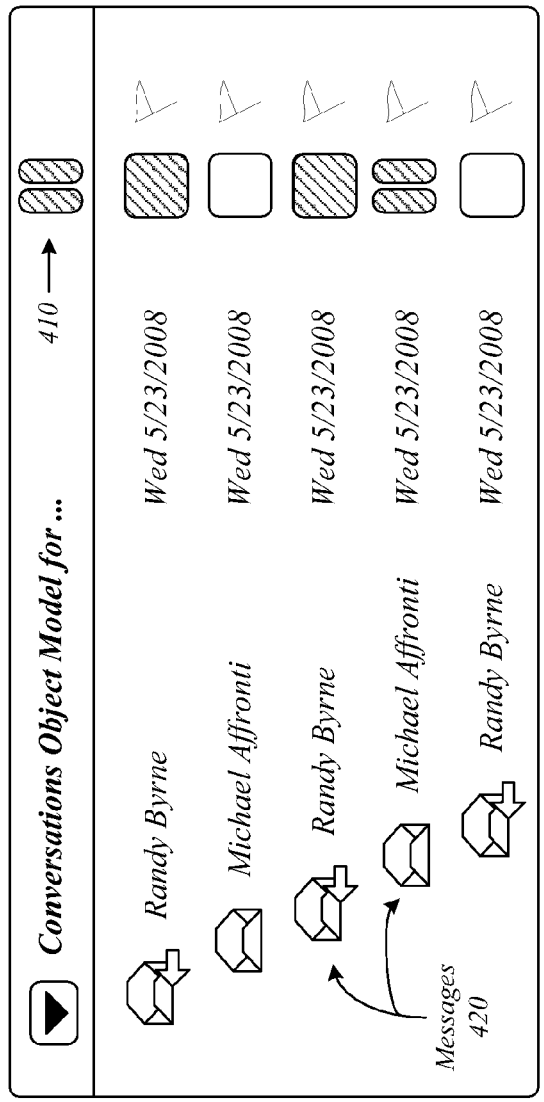
FIG. 6 illustrates an embodiment of a third conversation view.
Figure 6:
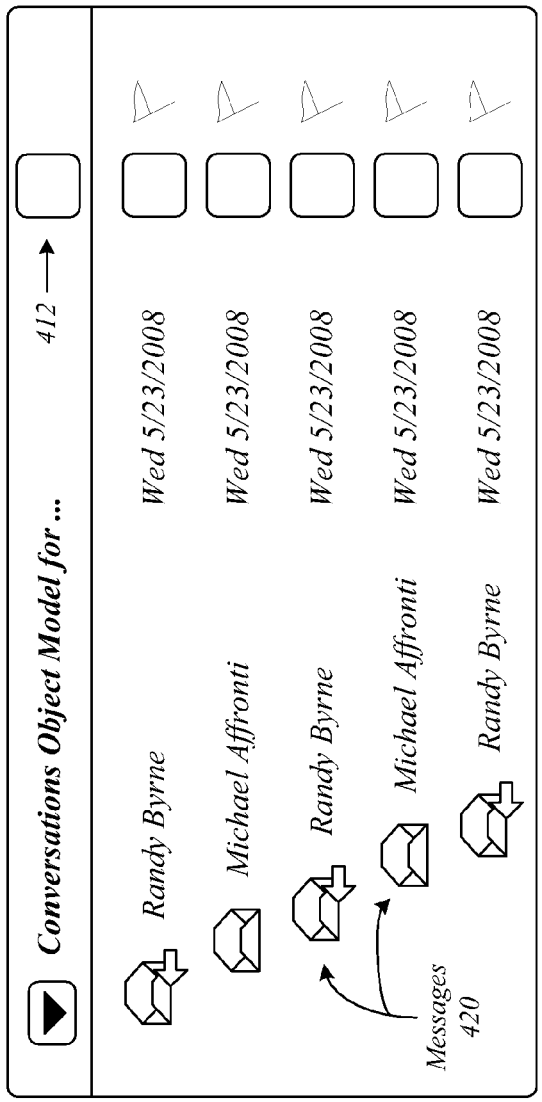

FIG. 6 illustrates an embodiment of conversation views 602, 604. The conversation views 602, 604 also represent conversation views grouping messages by a conversation thread. The conversation view 602 illustrates that some of the category indicators 410 are shaded thereby indicating a category has been assigned to the corresponding messages 420. The conversation manager module 336 may remove a category while a single conversation item is in focus. For example, when a user selects a "Clear All Categories" user interface button on the ribbon user interface, the conversation manager module 336 removes all categories from all messages in all folders. This is true even when a message 420 has multiple assigned categories, as indicated by the single category indicator 410 separated into multiple category indicators 410. This is typically not an ongoing action. The conversation manager module 336 removes the always category conversation rule from the CAT.

Figure 7:
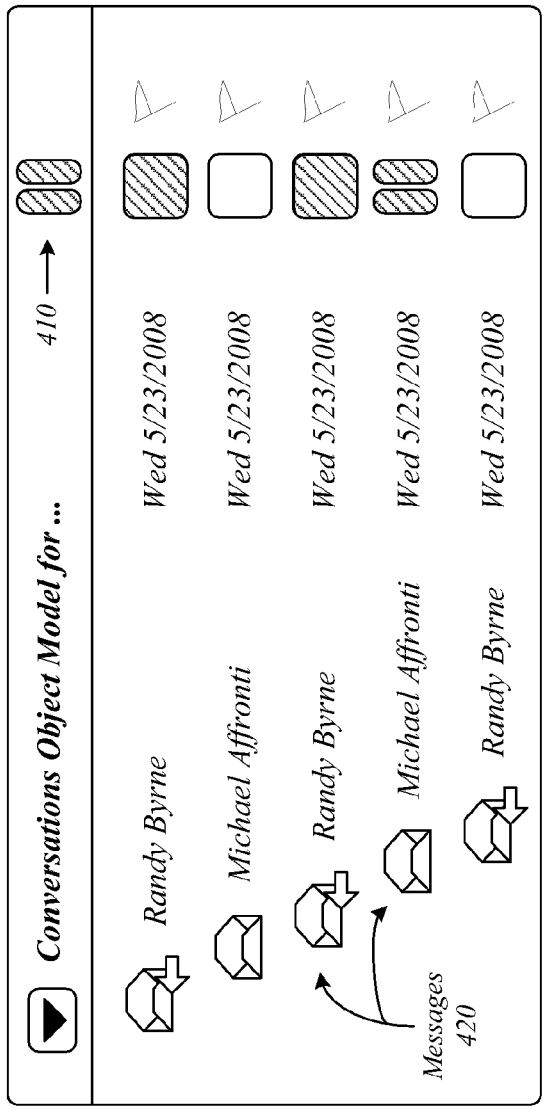
FIG. 7 illustrates an embodiment of a fourth conversation view.
Figure 7:
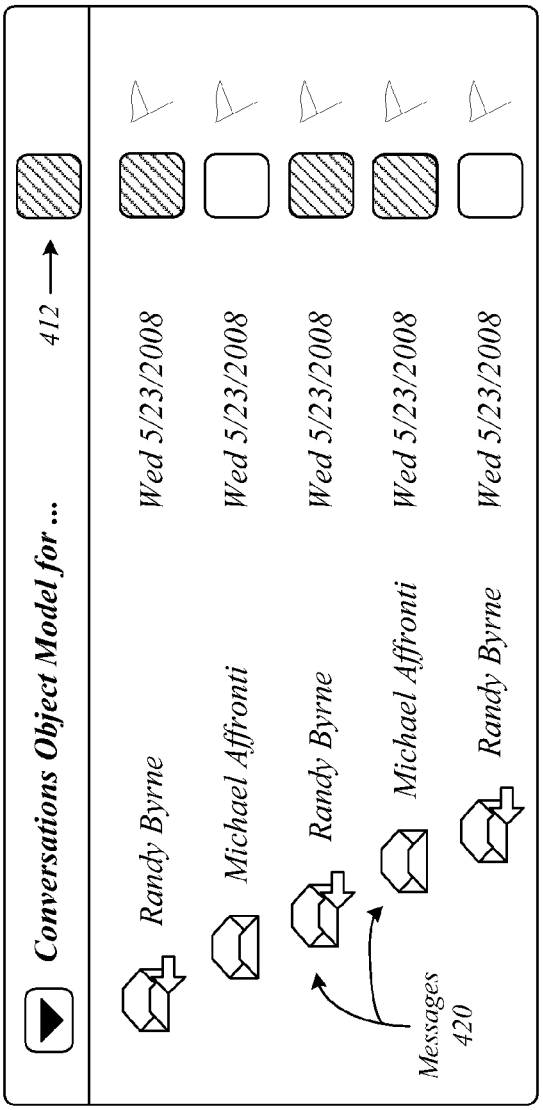

FIG. 7 illustrates an embodiment of conversation views 702, 704. The conversation views 702, 704 also represent conversation views grouping messages by a conversation thread. The conversation thread 702 illustrates that some of the category indicators 410 are shaded, and further, that some of the messages 420 have multiple assigned categories as indicated by the separation of the single category indicator 410 into multiple category indicators 410 per some of the messages 420. The conversation manager module 336 may remove a single category of the multiple categories assigned to a conversation item while a single conversation item is in focus. For example, when a user selects a "Clear A Category" user interface button on the ribbon user interface, the conversation manager module 336 removes only the chosen category from all messages in all folders. For example, the message 420 for "Michael Affronti" having two categories assigned to it is modified by the conversation manager module 336 to remove one of the two categories, as indicated by the multiple category indicators 410 becoming a single category indicator 410. This is typically not an ongoing action. The conversation manager module 336 removes the always category conversation rule for the chosen category from the CAT. The conversation manager module 336 may apply similar logic whenever multiple conversation items are in focus when the "Clear A Category" user interface button is actuated.

Figure 8:
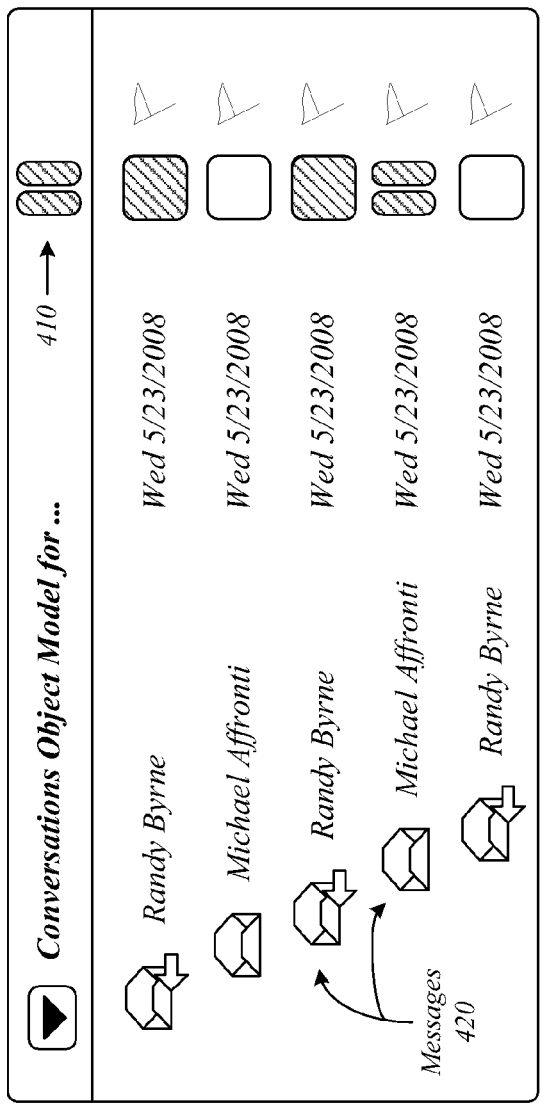
FIG. 8 illustrates an embodiment of a fifth conversation view.
Figure 8:
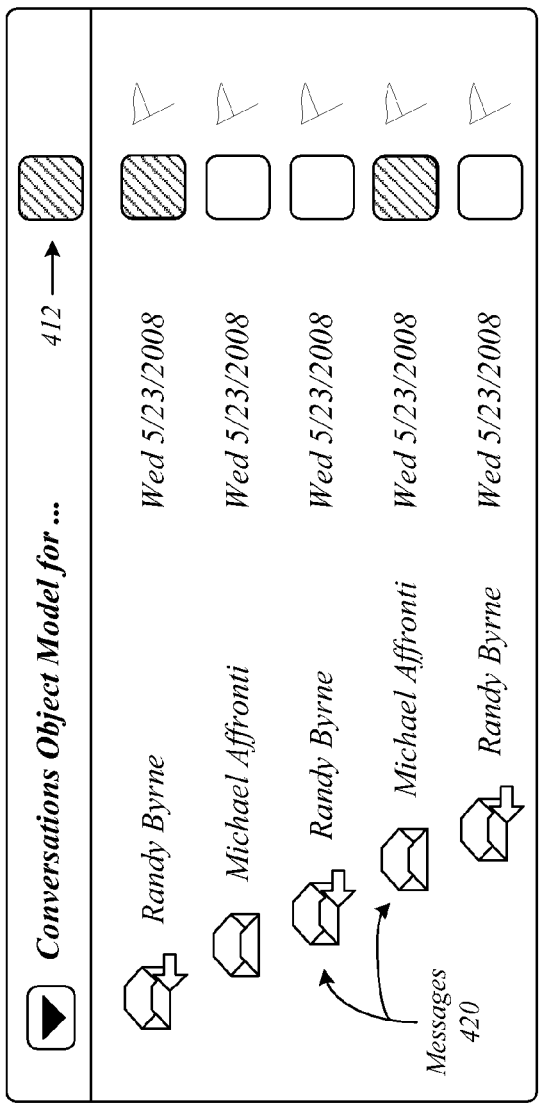

FIG. 8 illustrates an embodiment of conversation views 802, 804. The conversation views 802, 804 also represent conversation views grouping messages by a conversation thread. The conversation thread 802 illustrates that some of the category indicators 410 are shaded, and further, that some of the messages 420 have multiple assigned categories as indicated by the separation of the single category indicator 410 into multiple category indicators 410 per some of the messages 420. The conversation manager module 336 may remove a single category of the multiple categories assigned to a conversation item while a single conversation item is in focus. For example, when a user selects a "Clear A Category" user interface button on the ribbon user interface, the conversation manager module 336 removes only the chosen category from all messages in all folders. For example, the message 420 for "Michael Affronti" having two categories assigned to it is modified by the conversation manager module 336 to remove one of the two categories, as indicated by the multiple category indicators 410 becoming a single category indicator 410. Furthermore, the conversation manager module 336 may be arranged to act on messages 420 of a selected message type, such as all messages for "Michael Affronti" for example. In this case, the conversation manager module 336 only removes the chosen category or categories from the messages 420 of the same message type.

Whenever a new incoming message arrives at the incoming message module 332, and the conversation identification module 334 identifies the incoming message as part of a conversation thread, the conversation manager module 336 determines whether a conversation rule is associated with the conversation thread, and if so, applies the conversation rule to the incoming message. The conversation manager module 336 consults the CAT and performs subsequent message handling operations on the incoming message in accordance with the various conversation rules associated with the conversation thread.

By way of example, assume a user named Michael likes to stay on top of a lot of mail during the course of the day. He has rules that move distribution list mail to different folders, but still works hard to keep track of the regular mail he receives in his Inbox. One of his colleagues starts up an e-mail thread to his team distribution list, which Michael receives in his Inbox, about the upcoming college basketball playoffs. Michael is not interested in participating in this year's pool and would like to remove the thread from his Inbox. He choose the "Always Delete" action and the entire thread is moved to his Deleted Items folder. As his colleagues continue to talk on the thread, all subsequent replies are silently placed right in Michael's Deleted Items, keeping his inbox clear of the noise of that conversation while not forcing him to make a one-off rule or remove himself from that (usually) important alias.

In another example, assume a user named Paul is a filer and constantly moves mail to different folders based on the project or person that sent it. As new conversations arrive in his inbox, Paul can easily act on just the messages that have arrived in that folder and move them to wherever he'd like. A specific conversation about the "Morandi" project pops up and continues to be active, so Paul uses the "Always Move" action to easily have new items in that conversation go the "Morandi Project" folder when they arrive.

In yet another example, assume a user named Mary categorizes new messages as they arrive. As subsequent replies arrive for a conversation, Mary needs to manually categorize each item individually each time a new one arrives. Mary uses the "Always Categorize" action to recognize that new items have arrived in the conversation and automatically apply the correct categories from the first message to the rest of the conversation.

In addition to applying conversation rules for incoming messages, the conversation manager module 336 also applies conversation rules to stored messages. The message database 350 stores a plurality of messages for each conversation thread. When the conversation manager module 336 creates a new conversation rule for the conversation thread, the conversation manager module 336 applies the conversation rule to the plurality of stored messages for the appropriate conversation thread.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 9:
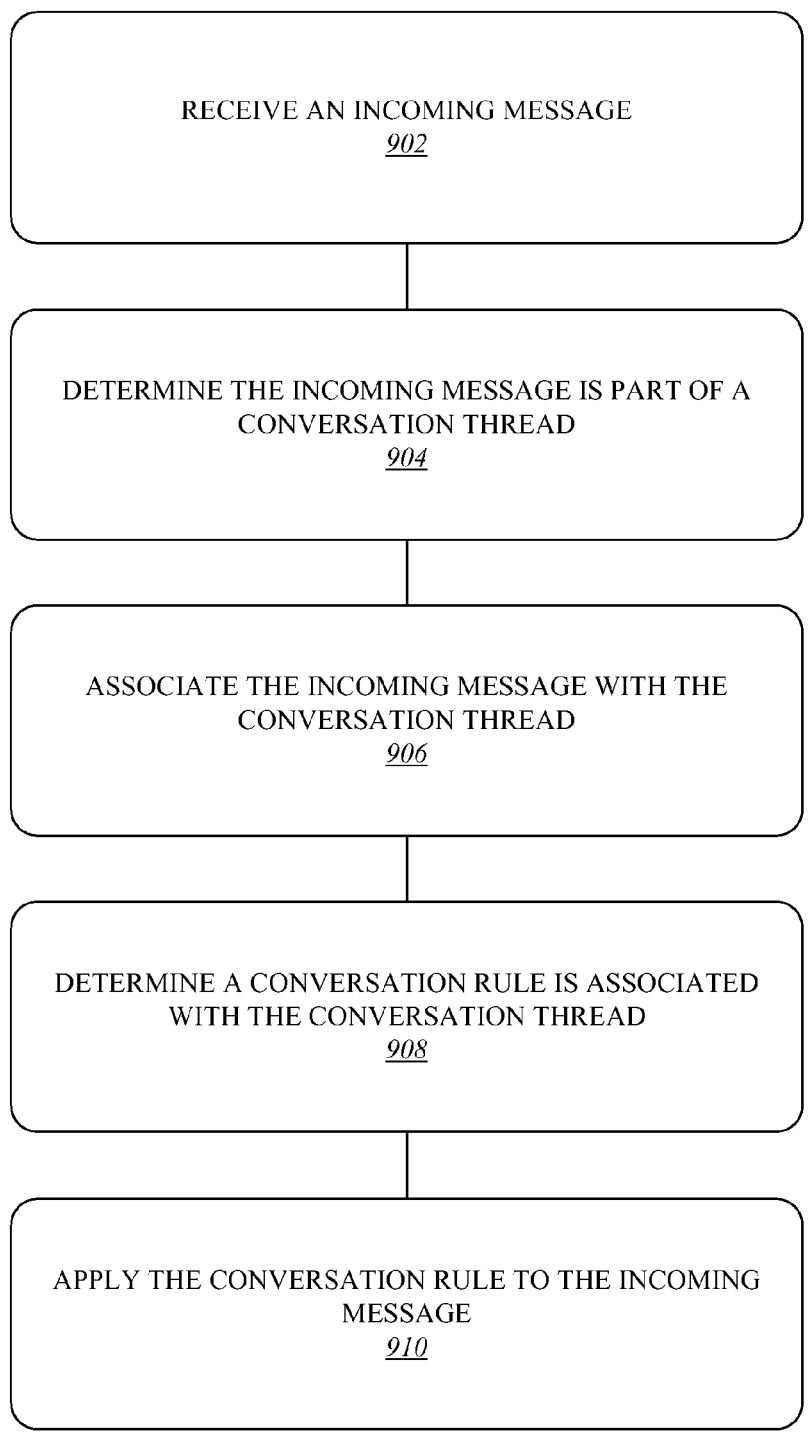
FIG. 9 illustrates an embodiment of a logic flow.

FIG. 9 illustrates one embodiment of a logic flow 900 suitable for practicing the various embodiments. The logic flow 900 may be representative of some or all of the operations executed by one or more embodiments described herein.

In the illustrated embodiment shown in FIG. 9, the logic flow 900 may receive an incoming message at block 902. For example, incoming message module 332 interacts with operating system 128 to receive incoming e-mail messages that are received from network 118 by network interface 220. For instance, incoming message module 332 may use an interface provided by operating system 128 to configure a callback that causes operating system 128 to provide incoming e-mail messages to incoming message module 332. When incoming message module 332 receives an incoming e-mail message, incoming message module 332 may perform one or more e-mail processing operations on the incoming e-mail message. After incoming message module 332 performs the e-mail processing operations on the incoming e-mail message, incoming message module 332 may provide the incoming e-mail message to conversation identification module 334.

The logic flow 900 may determine the incoming message is part of a conversation thread at block 904. For example, conversation identification module 334 receives incoming e-mail messages from incoming message module 332 and attempts to identify an existing conversation associated with the incoming e-mail message. If conversation identification module 334 cannot successfully identify an existing conversation associated with the incoming e-mail message, conversation identification module 334 may associate the incoming e-mail message with a new conversation. The conversation identification module 334 may utilize any number of different algorithms and conditions to explicitly or implicitly determine whether a message is part of a conversation thread. The embodiments are not limited in this context.

The logic flow 900 may associate the incoming message with the conversation thread at block 906. For example, if the incoming message module 332 identifies the incoming message as part of an existing conversation thread, the conversation identification module 334 associates the incoming message with the conversation thread by assigning the incoming message a common conversation identifier in the appropriate property for the incoming message. If the incoming message module 332 does not identify the incoming message as part of an existing conversation thread, however, the conversation identification module 334 associate the incoming e-mail message with a new conversation by assigning it a new conversation identifier. After conversation identification module 334 associates the incoming e-mail message with an existing conversation or associates the incoming e-mail message with a new conversation, conversation identification module 334 may store in a message database 350 the incoming e-mail message along with a conversation identifier that identifies the conversation associated with the incoming e-mail message.

The logic flow 900 may determine a conversation rule is associated with the conversation thread at block 908. For example, the conversation manager module 336 searches a CAT to determine whether a conversation rule is associated with the conversation thread. The conversation manager module 336 may search the CAT using any number of different search criteria, such as the conversation identifier, for example.

The logic flow 900 may apply the conversation rule to the incoming message at block 910. For example, when the conversation manager module 336 locates a conversation rule associated with the conversation thread, the conversation manager module 336 applies the located conversation rule to the incoming message. The conversation manager module 336 performs certain message processing operations on the incoming message as defined by the conversation rule, such as deleting the incoming message, moving the incoming message, categorizing the incoming message, forwarding the incoming message to another e-mail application 300 for another user, replying to the incoming message, copying the incoming message, or any other message processing operations made available by a given e-mail application 300. The conversation manager module 336 may also use an incoming message and corresponding conversation rule to actuate or trigger subsequent operations for other messages stored by the message database 350 or application programs executing on the computing devices 110, 130.

FIG. 10 illustrates a diagram an article of manufacture 1000 suitable for storing logic for the various embodiments. As shown, the article of manufacture 1000 may comprise a storage medium 1002 to store logic 1004. Examples of the storage medium 1002 may include one or more types of computer-readable storage media capable of storing electronic data, including volatile memory or non-volatile memory, removable or non-removable memory, erasable or non-erasable memory, writeable or re-writeable memory, and so forth. Examples of the logic 1004 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 1000 and/or the computer-readable storage medium 1002 may store logic 1004 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   receiving an incoming message;
   determining the incoming message is part of a conversation thread comprising a plurality of stored messages;
   associating the incoming message with the conversation thread by assigning the incoming message with a conversation identifier for the conversation thread;
   creating a conversation rule for the conversation thread, the conversation rule being established once for the conversation thread;
   storing the conversation rule for the conversation thread in a conversation action table, the conversation action table comprising a plurality of columns, the plurality of columns comprising at least a conversation identifier, a Boolean parameter to indicate whether the conversation rule is applied to the conversation identifier, information needed to implement the conversation rule, the information comprising at least a category name, and an expiration date and time to indicate when the conversation rule is to remain in force;
   determining that the conversation rule is associated with the conversation thread;
   applying the conversation rule to the incoming message; and
   automatically applying the conversation rule to the plurality of stored messages in the conversation thread.

2. The method of claim 1, further comprising the incoming message as an e-mail message, a text message, a short message service message, a multimedia message server message, a voice message, or a video message.

3. The method of claim 1, wherein creating a conversation rule for the conversation thread, comprises creating an always delete conversation rule to automatically route the incoming message to a deleted items folder.

4. The method of claim 1, wherein creating a conversation rule for the conversation thread comprises creating an always move conversation rule to automatically route the incoming message to a target items folder.

5. The method of claim 1, wherein creating a conversation rule for the conversation thread comprises creating an always categorize conversation rule to automatically assign a category for the incoming message.

6. The method of claim 1, wherein associating the incoming message with the conversation thread further comprises at least one of:
   determining that the incoming message includes an "in-reply-to" property specifying a value that corresponds to a value specified by a "message identifier" property of the at least one existing message in the conversation thread;
   determining that the incoming message includes a "references" property specifying a value that corresponds to a value specified by the "message identifier" property of the at least one existing message in the conversation thread; and
   determining that a normalized "subject" property of the incoming message corresponds to a normalized "subject" property of the at least one existing message in the conversation thread.

7. An article comprising a tangible computer-readable memory storage containing instructions that if executed by a computer system, enable the computer system to:
   determine an incoming message is part of a conversation thread comprising a plurality of stored messages;
   associate the incoming message with the conversation thread by assigning the incoming message with a conversation identifier for the conversation thread;
   create a conversation rule for the conversation thread, the conversation rule being established once for the conversation thread;
   store the conversation rule for the conversation thread in a conversation action table, the conversation action table comprising a plurality of columns, the plurality of columns comprising at least a conversation identifier, a Boolean parameter to indicate whether the conversation rule is applied to the conversation identifier, information needed to implement the conversation rule, the information comprising at least a category name, and an expiration date and time to indicate when the conversation rule is to remain in force;
   retrieve a conversation rule associated with the conversation thread;
   apply the conversation rule to the incoming message; and
   automatically apply the conversation rule to the plurality of stored messages in the conversation thread.

8. The article of claim 7, wherein the conversation rule comprises an always delete conversation rule to automatically route the incoming message to a deleted items folder, an always move conversation rule to automatically route the incoming message to a target items folder, or an always categorize conversation rule to automatically assign a category for the incoming message.

9. An apparatus, comprising:
   an incoming message module operative to receive an incoming message;
   a conversation identification module communicatively coupled to the incoming message module, the conversation identification module operative to determine the incoming message is part of a conversation thread, and associate the incoming message with the conversation thread by setting a conversation identifier property of the incoming message to a conversation identifier, for the conversation thread, the conversation thread comprising a plurality of stored messages; and
   a conversation manager module communicatively coupled to the conversation identification module, the conversation manager module operative to:
      create a conversation rule for the conversation thread, the conversation rule being established once for the conversation thread;
      store the conversation rule for the conversation thread in a conversation action table, the conversation action table comprising a plurality of columns, the plurality of columns comprising at least a conversation identifier, a Boolean parameter to indicate whether the conversation rule is applied to the conversation identifier, information needed to implement the conversation rule, the information comprising at least a category name, and an expiration date and time to indicate when the conversation rule is to remain in force;

determine that the conversation rule is associated with the conversation thread;

apply the conversation rule to the incoming message; and automatically apply the conversation rule to the plurality of stored messages in the conversation thread.

10. The apparatus of claim 9, the messages comprising e-mail messages, text messages, short message service messages, multimedia message server messages, voice messages, or video messages.

11. The apparatus of claim 9, wherein the conversation rule comprises an always delete conversation rule to automatically route the incoming message to a deleted items folder, an always move conversation rule to automatically route the incoming message to a target items folder, or an always categorize conversation rule to automatically assign a category for the incoming message.

12. The apparatus of claim 9, comprising a message database communicatively coupled to the conversation manager module, the message database operative to store the plurality of messages for the conversation thread.

* * * * *